(12) United States Patent
Dilluvio

(10) Patent No.: US 7,275,783 B2
(45) Date of Patent: Oct. 2, 2007

(54) CONVERTIBLE ROOF SYSTEM WITH DAMPENING DEVICE

(76) Inventor: Christopher J. Dilluvio, 32460 Wayburn West, Farmington Hills, MI (US) 48334

(*) Notice: Subject to any disclaimer, the term of this patent is extended or adjusted under 35 U.S.C. 154(b) by 270 days.

(21) Appl. No.: 11/034,608

(22) Filed: Jan. 13, 2005

(65) Prior Publication Data

US 2006/0061129 A1 Mar. 23, 2006

Related U.S. Application Data

(60) Provisional application No. 60/612,384, filed on Sep. 23, 2004.

(51) Int. Cl.
*B60J 7/12* (2006.01)
(52) U.S. Cl. .................. 296/107.09; 296/107.16
(58) Field of Classification Search ........... 296/107.01, 296/107.2
See application file for complete search history.

(56) References Cited

U.S. PATENT DOCUMENTS

| | | | |
|---|---|---|---|
| 1,463,193 A | | 7/1923 | Botella |
| 2,581,660 A | * | 1/1952 | Horton ........................ 296/117 |
| 2,768,857 A | | 10/1956 | Albrecht |
| 2,794,672 A | | 6/1957 | Burzi |
| 3,097,883 A | * | 7/1963 | Gilson et al. ............... 296/108 |
| 3,159,422 A | | 12/1964 | Lautenbach |
| 3,473,842 A | * | 10/1969 | Bracey et al. ............... 296/116 |
| 3,905,493 A | * | 9/1975 | Logue ........................ 414/541 |
| 4,573,732 A | | 3/1986 | Muscat |
| 4,854,634 A | * | 8/1989 | Shiraishi et al. ............. 296/108 |
| 4,929,015 A | | 5/1990 | Bauer |
| 5,004,291 A | | 4/1991 | Bauer et al. |
| 5,769,483 A | * | 6/1998 | Danzl et al. ............. 296/107.08 |
| 5,979,970 A | * | 11/1999 | Rothe et al. ............ 296/107.17 |
| 6,048,021 A | * | 4/2000 | Sautter, Jr. .................. 296/117 |
| 6,237,986 B1 | * | 5/2001 | Neubrand et al. ...... 296/107.01 |
| 6,412,860 B1 | | 7/2002 | Reinsch |
| 6,416,111 B1 | | 7/2002 | Neubrand |
| 6,454,342 B2 | | 9/2002 | Heselhaus et al. |
| 6,497,446 B2 | * | 12/2002 | Obendiek .............. 296/107.17 |
| 6,550,842 B1 | * | 4/2003 | Halbweiss et al. .......... 296/116 |
| 6,623,065 B2 | | 9/2003 | Halbweiss et al. |

(Continued)

FOREIGN PATENT DOCUMENTS

FR 459.931 11/1913

OTHER PUBLICATIONS

"Drop-top Rolls," Nov. 22, 2004, AutoWeek, p. 4.
MacKenzie, Angus, "Sunshine Superstar," May 2005, Motor Trend, pp. 74-78.
Vaughn, Mark, "Chrysler 300C Cabriolet," (Newport Convertible Engineering, Inc.), Nov. 22, 2004, AutoWeek, p.4.

(Continued)

*Primary Examiner*—Dennis H. Pedder
*Assistant Examiner*—Mike Hernandez
(74) *Attorney, Agent, or Firm*—Harness, Dickey & Pierce, P.L.C.

(57) ABSTRACT

A convertible roof includes a segmented pair of front roof rails that in-fold when being retracted, thereby reducing the packaging space required to stow the convertible roof. The in-folding of the segmented front roof rails is controlled by linkages between the segmented portions and the number one roof bow and synchronizes and constrains the in-folding of the segmented front roof rails. A dampening device is utilized to dampen a portion of the movement of the top stack mechanism between extended and retracted positions.

39 Claims, 20 Drawing Sheets

U.S. PATENT DOCUMENTS

| | | |
|---|---|---|
| 6,666,494 B2 | 12/2003 | Antreich |
| 6,786,527 B2 * | 9/2004 | Guillez et al. ......... 296/107.07 |
| 6,793,267 B2 | 9/2004 | Hesselhaus |
| 6,802,554 B1 * | 10/2004 | Just et al. .............. 296/107.09 |
| 6,902,223 B2 * | 6/2005 | Hollenbeck et al. ... 296/107.09 |
| 7,032,951 B2 | 4/2006 | Powell |
| 2002/0125731 A1 | 9/2002 | Hasselgruber et al. |
| 2003/0038501 A1 | 2/2003 | Heselhaus |
| 2004/0232721 A1 | 11/2004 | Rawlings et al. |

OTHER PUBLICATIONS 9 photographs of a convertible roof mechanism believed to have been used on Cadillac Eldorado Convertibles for the 1971-1976 model years.

* cited by examiner

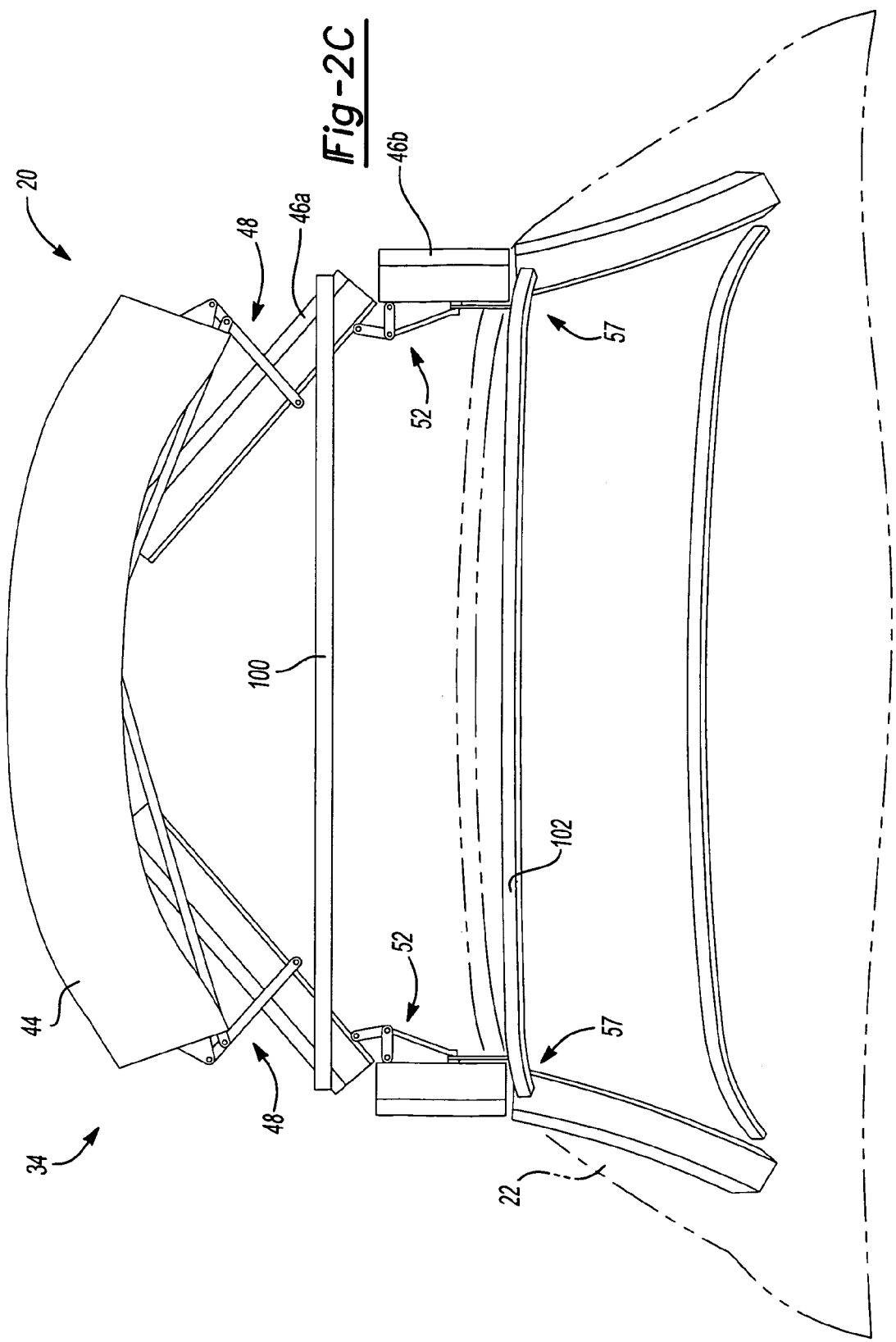

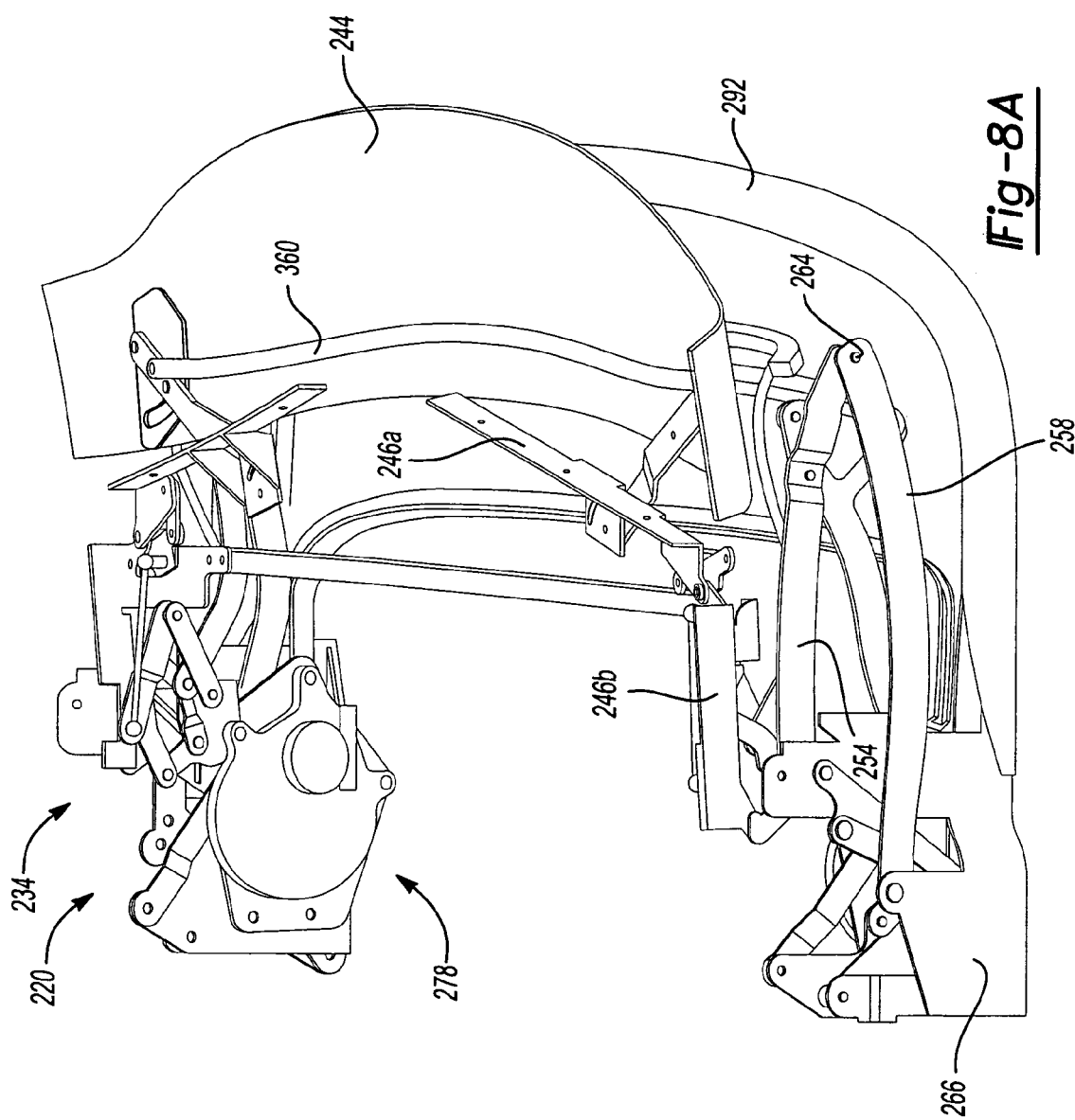

CONVERTIBLE ROOF SYSTEM WITH DAMPENING DEVICE

CROSS-REFERENCE TO RELATED APPLICATION

This application claims the benefit of U.S. Provisional Application No. 60/612,384, filed on Sep. 23, 2004. The disclosure of the above application is incorporated herein by reference.

BACKGROUND AND SUMMARY OF THE INVENTION

The present invention relates to convertible roofs and, more particularly, to in-folding convertible roofs.

Traditional soft-top convertible roofs for automotive vehicles typically employ three, four or five roof bows, having an inverted U-shape spanning transversely across the vehicle for supporting a vinyl, canvass or polyester fabric pliable roof cover. A number one roof bow is mounted to a pair of front roof rails and is typically latched to a stationary front header panel of the automotive vehicle body disposed above the front windshield. A number two roof bow is typically mounted to either the front roof rails or to a pair of center roof rails which are pivotally connected to the front roof rails. Furthermore, a number three, four and any additional optional roof bows are commonly mounted to either the center pair of roof rails or to a pair of rear roof rails which are pivotally coupled to the center roof rails. The roof cover can also have a hard or rigid portion along with the pliable portion. For example, reference should be made to U.S. Pat. No. 5,429,409 entitled "Convertible Top", which is incorporated by reference herein.

Most traditional convertible roofs are stowed in a bootwell or stowage compartment that is located aft of a passenger compartment in the vehicle. A boot or tonneau cover is then used to cover the bootwell and conceal the convertible roof from view and/or protect the stowed roof from the environment. Optionally, a portion of the convertible roof can be visible when in the stowed position and provide a desired appearance for the vehicle.

Traditional soft-top convertible roofs, such as those discussed above, can present a packaging (stowing) difficulty when it is desired to use a "Z" folding roof. The difficulty is more pronounced when a "Z" folding roof is desired to be used on a larger vehicle (vehicle having front and rear seating areas). Additionally, the use of three pairs of coupled roof rails also adds to the packaging difficulty. The three pairs of coupled roof rails are pivoted relative and stacked upon one another. The packaging size of such a retraction mechanism requires the stowage compartment to accommodate the various lengths of the roof rails.

The available space for the stowage compartment in a vehicle, however, may be at a premium. That is, while it is desirable to provide a vehicle with a convertible roof, it is also desirable to provide sufficient storage space in the vehicle for use in storing objects other than the convertible roof. Thus, it would be advantageous to minimize the packaging space required to stow the convertible roof while maximizing the available space for other purposes, such as maintaining or increasing the size of the passenger compartment and/or the size of the general storage area or trunk of the vehicle when produced with a convertible roof.

Moreover, when the convertible roof spans a large passenger seating area the controlling of the final movements of the convertible roof when being raised or retracted may cause significant stress or torque to be exhibited on the components of the convertible roof. This increased force may be undesirable and may cause a reduction in the lifespan of the components that comprise and drive the convertible roof. Thus, it would be advantageous to minimize the impact or force imparted on the driving components of the convertible roof when reaching the fully extended or fully retracted state.

In accordance with the present invention, a convertible roof is provided which includes a segmented pair of front roof rails that in-fold when being retracted. The in-folding advantageously reduces the packaging space required to stow the convertible roof. In another aspect of the present invention, in-folding of the segmented front roof rails is controlled by synchronizing linkages between the segmented portions and the number one roof bow which synchronize the in-folding of the segmented front roof rails. The synchronization advantageously eliminates side-to-side drift of the convertible roof when moving between the raised and stowed positions. In accordance with another aspect of the present invention, a damper is employed to dampen a portion of the motion of the convertible roof as the top reaches a fully extended and fully retracted position. The dampening advantageously reduces high forces or stresses that are imparted on the drive mechanisms during the movement of the convertible roof between the extended and retracted positions.

Along with reducing the packaging space and/or excessive force or stress, additional objects, advantages and features of the present invention will become apparent from the following description and the pending claims, taken in conjunction with the accompanying drawings. It should be understood that the detailed description and the specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2A-2C are various views of the convertible roof of FIG. 1 in an intermediate position between the raised and stowed positions;

FIGS. 8A and 8B are respective perspective and top plan views of the convertible roof of FIG. 6 in the stowed position;

DETAILED DESCRIPTION OF THE PREFERRED EMBODIMENT

The following description of the preferred embodiment is merely exemplary in nature and is in no way intended to limit the invention, its application, or uses. As used herein, the term "substantially perpendicular" allows for some limited deviation from 90°, such as 90°±5°.

Figure 1:
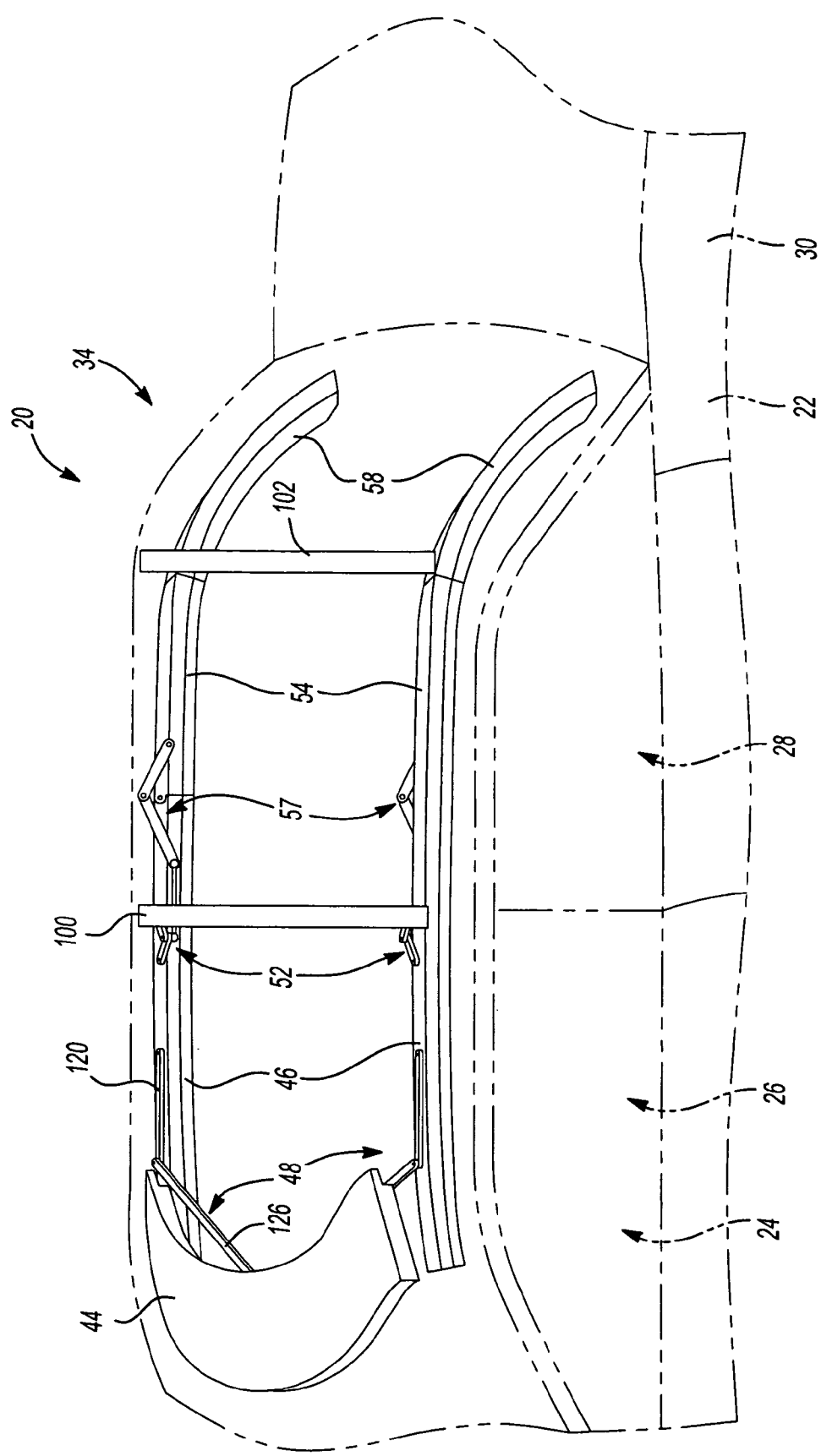
FIG. 1 is a perspective view of an automotive vehicle having an alternate embodiment of a convertible roof according to the principles of the present invention showing the convertible roof in the raised position.

FIGS. 1-5 show an alternate embodiment of an in-folding convertible roof 20 according to the principles of the present invention. Convertible roof 20 is employed on an automotive vehicle 22 having a passenger compartment 24 with front and rear passenger seating areas 26, 28 and a generally U-shaped bootwell or stowage compartment 30. Stowage compartment 30 is positioned aft of passenger compartment 24 with quarter trim portions extending along a portion of sides of passenger compartment 24. Convertible roof 20 is of the type utilizing a folding or top stack mechanism 34 and a roof cover 36 (shown in FIG. 2A only) and is operable between a fully raised position, as shown in FIG. 1, through intermediate positions, such as those shown in FIGS. 2A-2C, to a fully stowed position, as shown in FIGS. 3A and 3B. Roof cover 36 is made from a pliable material, such as vinyl, canvass or a polyester fabric. If desired, roof cover 36 can include a hard or rigid portion that, optionally, can be covered by the same material that comprises the soft portion of the cover to give a uniform appearance. A backlight (not shown) is attached to roof cover 36 and is not pivotally coupled to top stack mechanism 34. For example, reference should be made to U.S. Pat. No. 5,887,936 titled "Backlight System for Use in an Automotive Vehicle Convertible Roof," by Cowsert, and U.S. Pat. No. 6,102,467 titled "Backlight Retention System for Use in an Automotive Vehicle Convertible Roof," by Laurain et al., both of which are herein incorporated by reference. The backlight can be made of either a rigid material, such as glass, or a pliable transparent material, such as vinyl.

In the figures, convertible roof 20 and top stack mechanism 34 are shown symmetrical about a longitudinal, fore-and-aft center line 40 (shown in FIG. 3B) of vehicle 22. Center line 40, thus, also serves as a longitudinal center line for convertible roof 20 and top stack mechanism 34. Top stack mechanism 34 includes right and left roof linkages on the respective right and left sides of vehicle 22. For brevity, at times only one side of top stack mechanism 34 and convertible roof 20 may be shown and/or discussed. However, it should be understood that the other side linkages are also provided as part of top stack mechanism 34 and convertible roof 20 and are mirrored images of the side depicted and/or discussed. Also, when using the terms "fore" and "aft," "front" and "back," and "forward" and "rearward" in describing the movement and components of top stack mechanism 34 and convertible roof 20, such reference refers to the orientation of the components when top stack mechanism 34 and convertible roof 20 are in the fully raised position.

Top stack mechanism 34 includes a number one roof bow 44 that extends transversely across vehicle 22 and is disposed above the front windshield header when in the fully raised position, as shown in FIG. 1. Roof cover 36 is attached to number one roof bow 44. Number one roof bow 44 is coupled to a pair of segmented front roof rails 46 by synchronizing linkage assemblies 48, described in more detail below.

Segmented front roof rails 46 include an in-folding portion 46a and a straight-folding portion 46b. In-folding and straight-folding portions 46a, 46b are pivotally connected together at pivot 50 and are interconnected by in-folding linkage assemblies 52, described in more detail below. Straight-folding portions 46b are pivotally connected to front portions of a pair of center roof rails 54 at pivots 56 and are interconnected with intermediate linkage assemblies 57, described in more detail below.

Figure 2A:
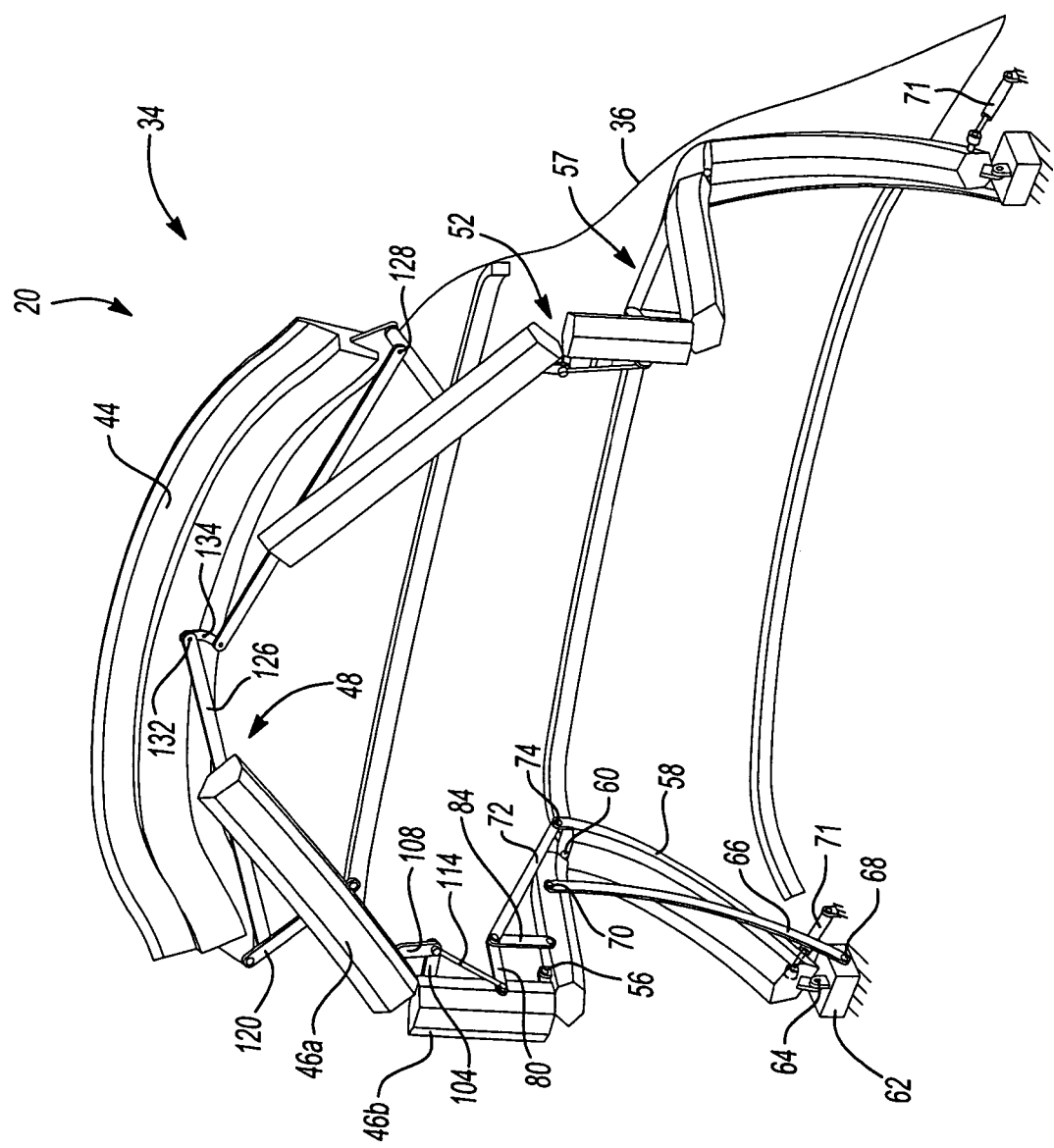

Rear portions of center roof rails 54 are pivotally connected to front or top portions of rear roof rails 58 at pivots 60. Referring now to FIG. 2A, the opposite ends of rear roof rails 58 are pivotally connected to fixed brackets 62 at pivots 64. Pivots 64 are aligned along a pivot axis 65 which is generally perpendicular to longitudinal center line 40. Rear roof rails rotate about pivots 64 and pivot axis 65 during extension and retraction of top stack mechanism 34, as describe below. Brackets 62 are fixed to vehicle 22 within stowage compartment 30.

Still referring to FIG. 2A, one end of a balance link 66 is pivotally coupled to bracket 62 at pivot 68 while an opposite end of balance link 66 is pivotally coupled to a rear portion of center roof rail 54 at pivot 70. The interconnection between center roof rail 54, rear roof rail 58, bracket 62 and balance link 66 forms a rear four-bar linkage assembly defined by pivots 60, 64, 68 and 70. A fluidic actuator 71 is pivotally connected to vehicle 22 and balance link 66. Actuator 71 is operable to move top stack mechanism 34 and convertible roof 20 between the raised and stowed positions, as described in more detail below. For brevity, a portion of the rear linkage assembly (balance link 66 and bracket 62) along with actuator 71 are shown only in FIG. 2A.

The rear linkage assembly and intermediate linkage assembly 57 are interconnected by a control link 72. One end of control link 72 is pivotally connected to an extension of rear roof rail 58 at pivot 74. An opposite end of control link 72 is pivotally connected to intermediate linkage assembly 57 at pivot 76. Control link 72 causes intermediate linkage assembly 57 to rotate front roof rail 46 relative to center roof rail 54 during extension and retraction of top stack mechanism 34, as described in more detail below.

Figure 4A:
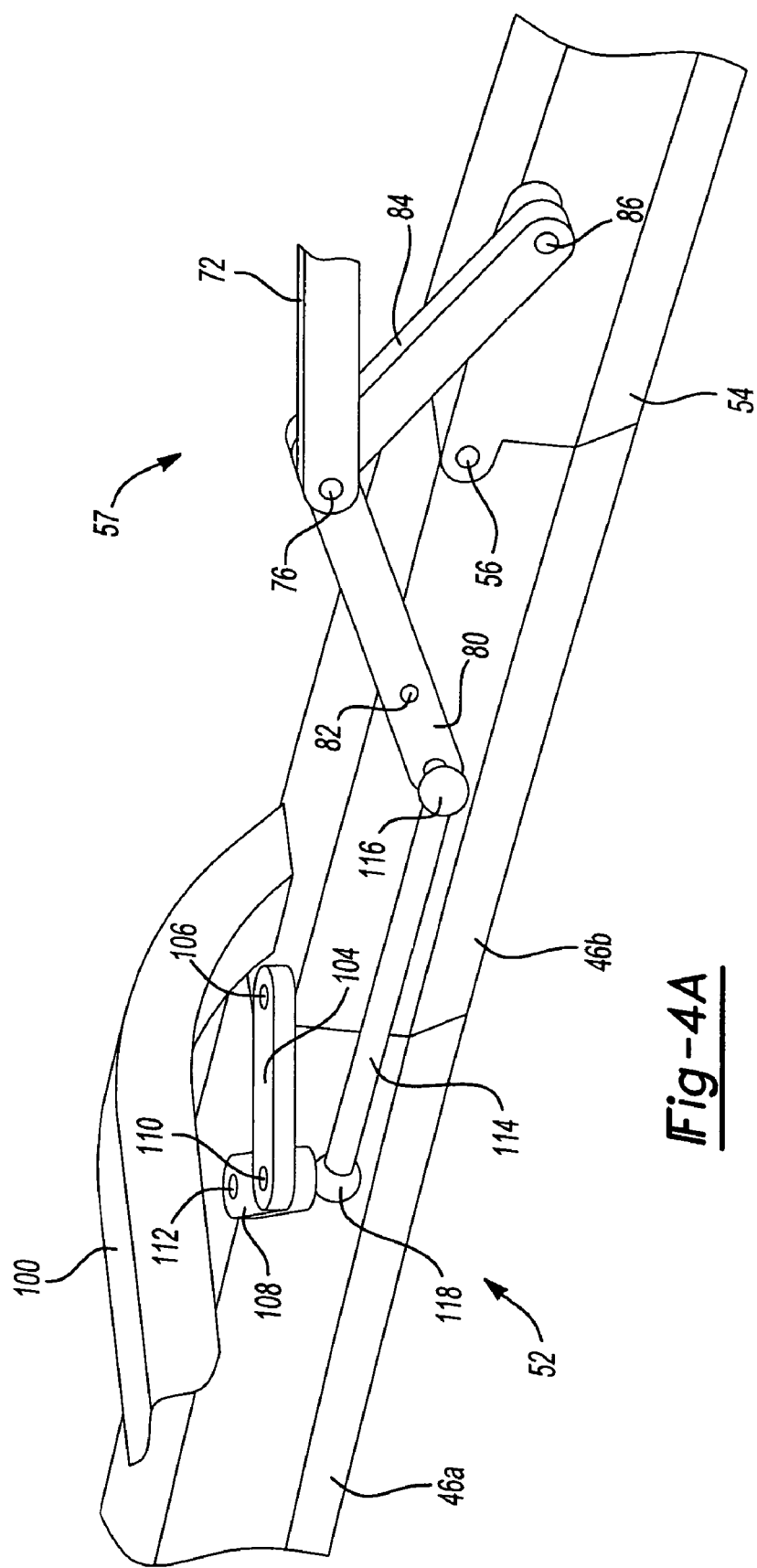
FIGS. 4A and 4B are fragmented perspective views of a portion of the convertible roof of FIG. 1 respectively in a raised position and partially retracted position showing the linkage assemblies between the center and front roof rail and between the segmented portions of the front roof rail.
Figure 4B:
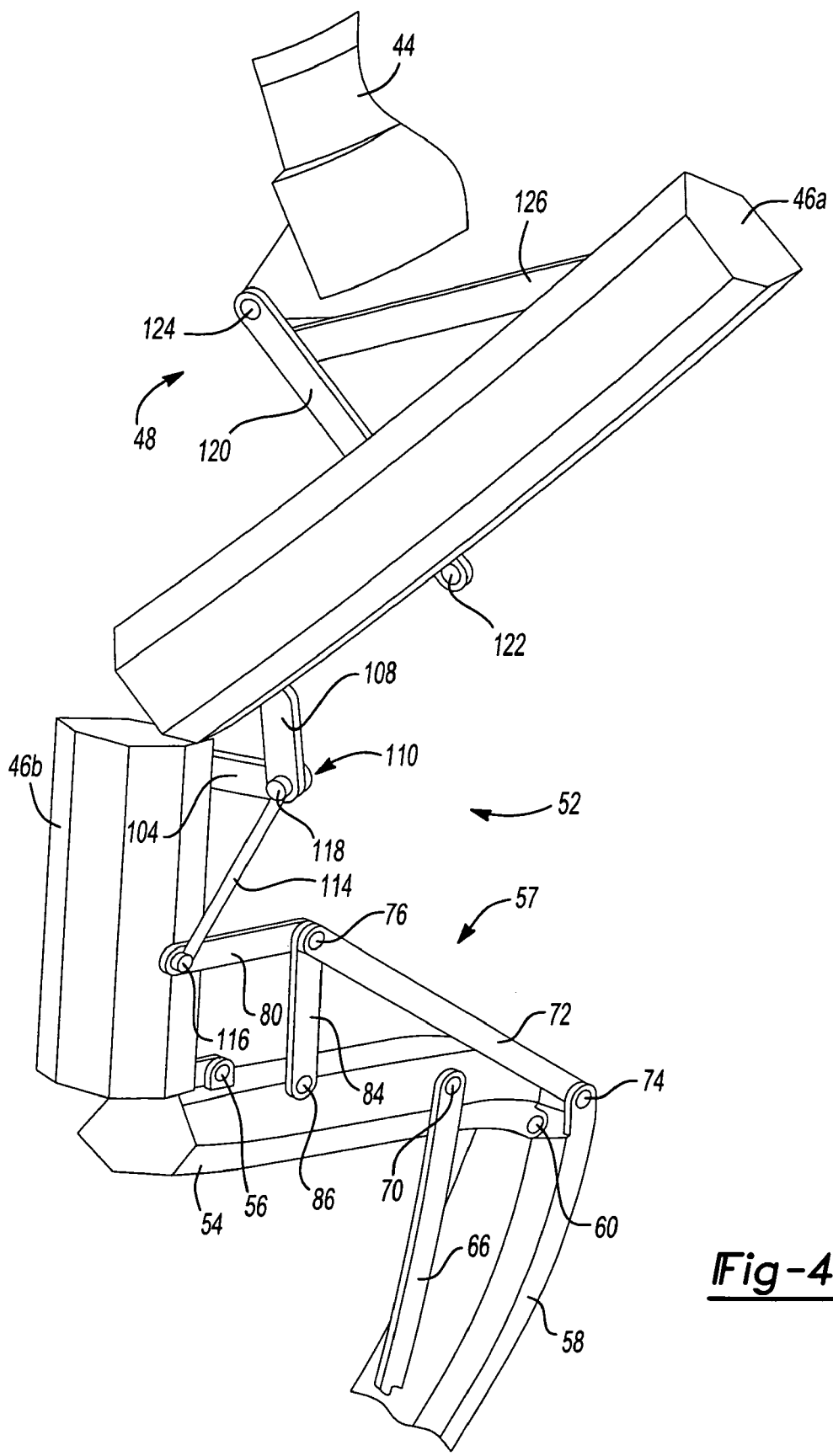
Figure 5:
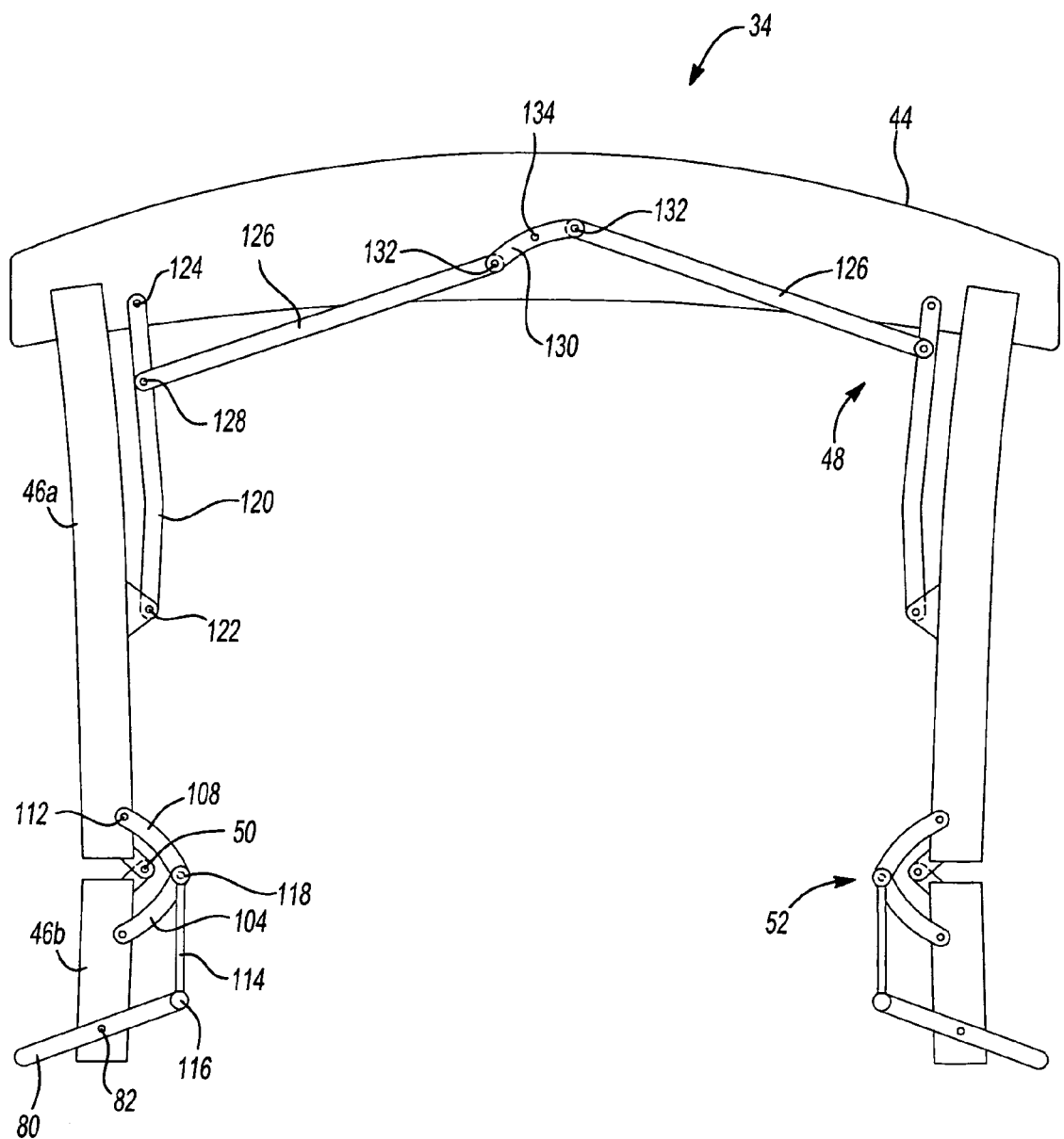
FIG. 5 is a simplified schematic representation of the various linkage assemblies used in the segmented front roof rail to provide the in-folding of a portion of the front roof rail in the convertible roof of FIG. 1.

Intermediate linkage assembly 57, as best seen in FIGS. 4A and 4B, interconnects straight-folding portion 46b of front roof rail 46 with center roof rail 54. Intermediate linkage assembly 57 includes a first link 80 having an intermediate portion pivotally connected to straight-folding portion 46b at pivot 82 while an end is pivotally connected to one end of a second link 84 at pivot 76. An opposite end of second link 84 is pivotally connected to an intermediate portion of center roof rail 54 at pivot 86. Intermediate linkage assembly 57 forms a four-bar linkage assembly including straight-folding portion 46b, first link 80, second link 84 and center roof rail 54 and is defined by pivots 82, 76, 86 and 56. Intermediate linkage assembly 57 controls the movement of front roof rail 46 relative to center roof rail 54 during the movement of top stack mechanism 34 between the raised and stowed positions, as described below.

A second roof bow 100 extends transversely across vehicle 22 and is fixedly attached to straight-folding portion 46b of front roof rail 46. Similarly, a third roof bow 102 extends transversely across vehicle 22 and is fixedly attached to rear roof rails 58. If desired, second and/or third roof bows 100, 102 can be formed or cast integrally with straight-folding portions and rear roof rails 46b, 58, respectively, if desired. Roof cover 36 is loosely attached to second and third roof bows 100, 102.

Referring now to FIGS. 2A-2C and 4A-4B, details of in-folding linkage assembly 52 are shown. In-folding linkage assembly 52 includes a first in-folding link 104 having one end pivotally connected to straight-folding portion 46b of front roof rail 46 at pivot 106 and an opposite end pivotally connected to an end of a second in-folding link 108 at pivot 110. The opposite end of second in-folding link 108 is pivotally connected to in-folding portion 46a of front roof rail 46 at pivot 112. In-folding linkage assembly 52 thereby forms a four-bar linkage assembly including straight-folding portion 46b, in-folding portion 46a, second in-folding link 108 and first in-folding link 104 and is defined by pivots 50, 112, 110 and 106. In-folding linkage assembly 52 controls the relative movement of in-folding portion 46a relative to straight-folding portion 46b during the extension and retraction of top stack mechanism 34, as described in more detail below.

A coupling link 114 interconnects in-folding linkage assembly 52 with intermediate linkage assembly 57. One end of coupling link 114 is connected to an end of first link 80 of intermediate linkage assembly 57 adjacent pivot 82 with a ball joint 116. The opposite end of coupling link 114 is coupled to in-folding linkage assembly 52 adjacent pivot 110 with a ball joint 118. Ball joints 116, 118 allow three degrees of movement of coupling link 114 relative to first link 80 and in-folding linkage assembly 52. Coupling link 114 transfers the motion of intermediate linkage assembly 57 to in-folding linkage assembly 52 to control and coordinate the extension and retraction of top stack mechanism 34, as described in more detail below.

Referring now to FIGS. 2A-2C and FIG. 5, details of synchronizing linkage assembly 48 are shown. Each synchronizing linkage assembly 48 includes a first synchronizing link 120 having one end pivotally connected to in-folding portion 46a of front roof rail 46 at pivot 122 and an opposite end pivotally connected to number one roof bow 44 at pivot 124. One end of a second synchronizing link 126 is pivotally connected to an intermediate portion of first synchronizing link 120 at pivot 128 while an opposite end of second synchronizing link 126 is pivotally connected to one end of a synchronizing crank 130 at pivot 132. An opposite end of synchronizing crank 130 is pivotally connected to the second synchronizing link 126 on the other side of top stack mechanism 34. A central portion of synchronizing crank 130 is pivotally connected to number one roof bow 44 at pivot 134. Synchronizing linkage assemblies 48 keep the two sides of top stack mechanism 34 in sync with one another as top stack mechanism 34 moves between the raised and retracted positions. Synchronizing linkage assemblies 48 also prevent cross car drift of top stack mechanism 34 during movement between the raised and stowed positions.

Figure 2B:
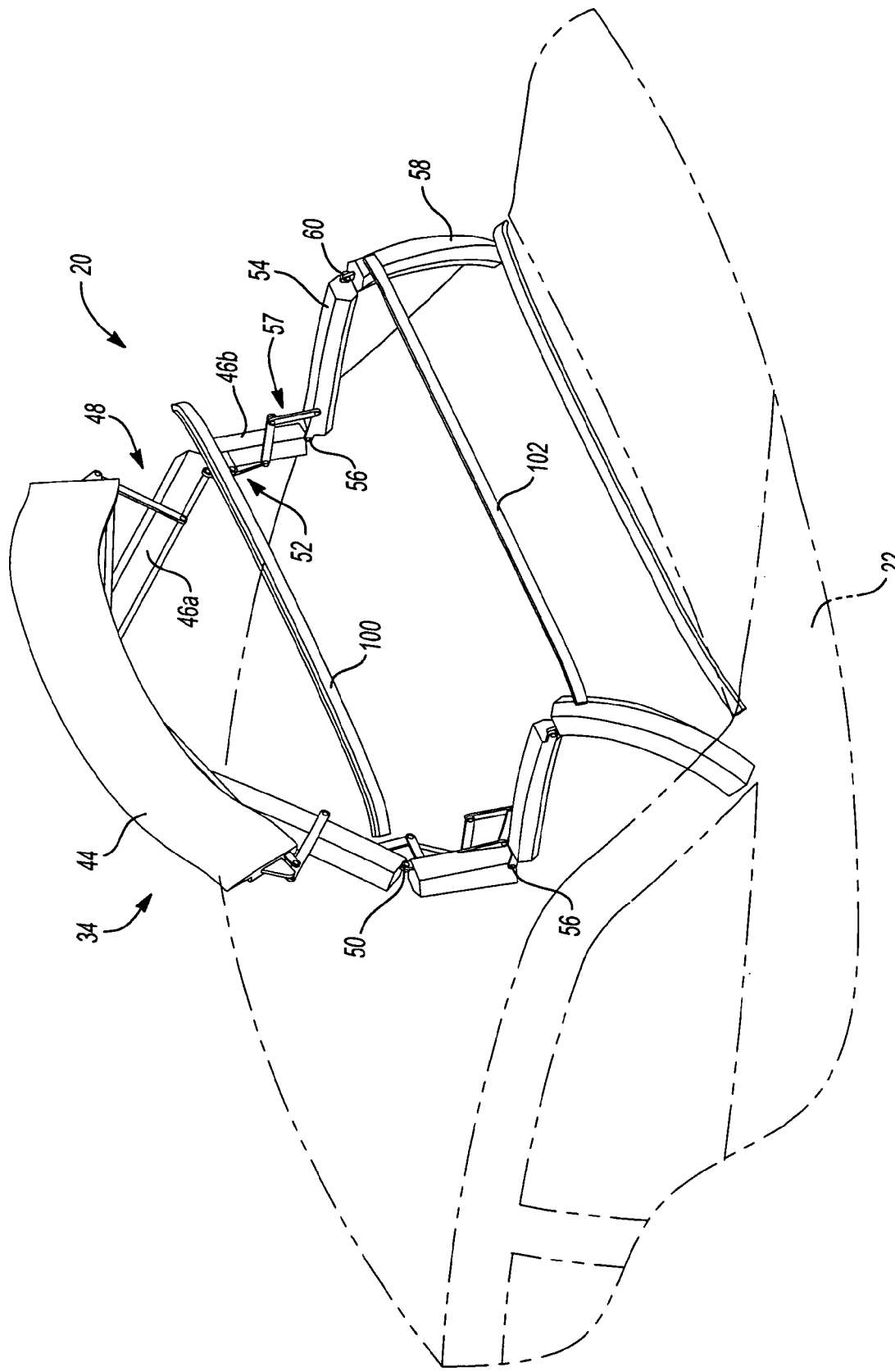
Figure 3A:
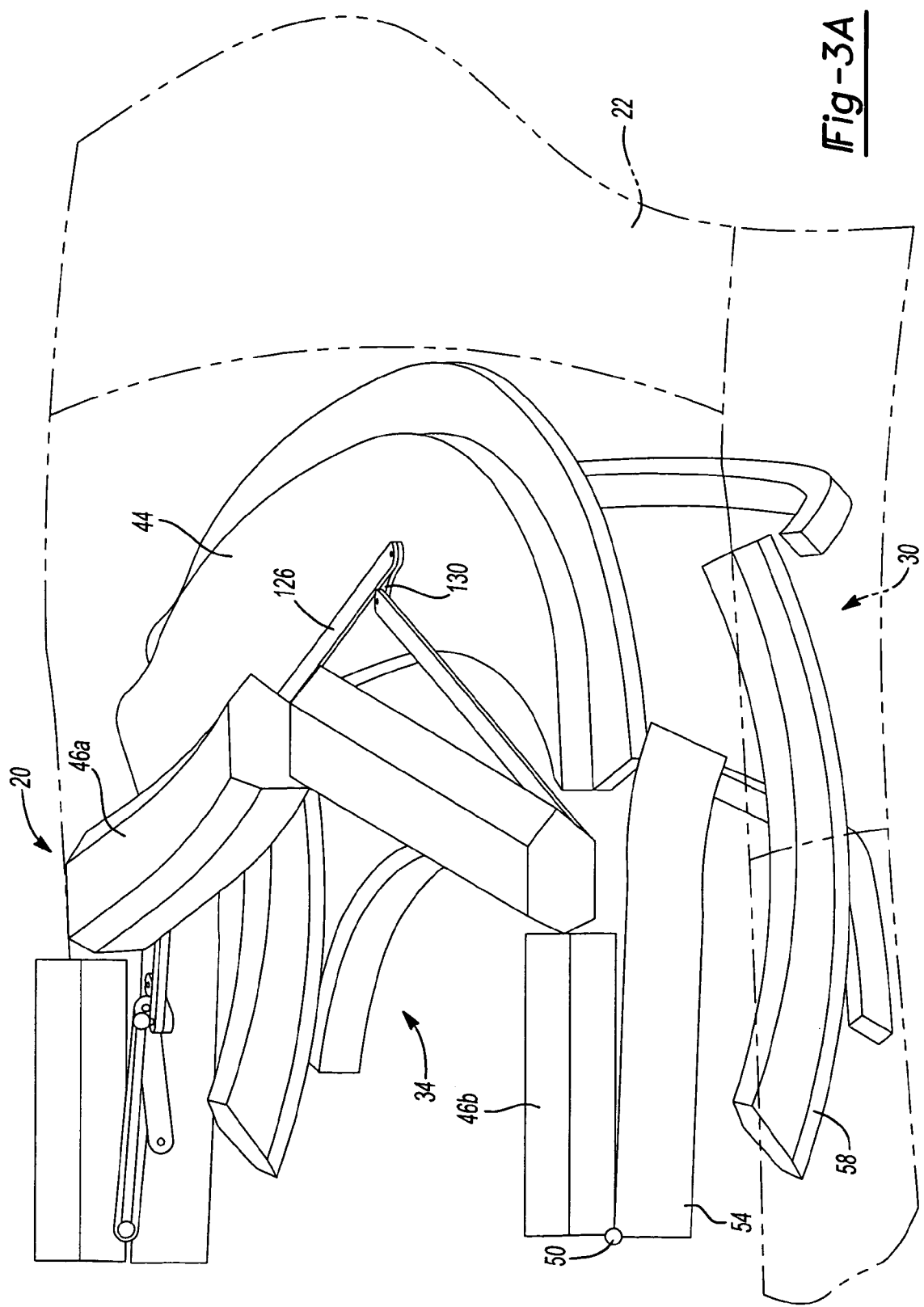
FIGS. 3A and 3B are respective side elevation and plan views of the convertible roof of FIG. 1 in the stowed position.
Figure 3B:
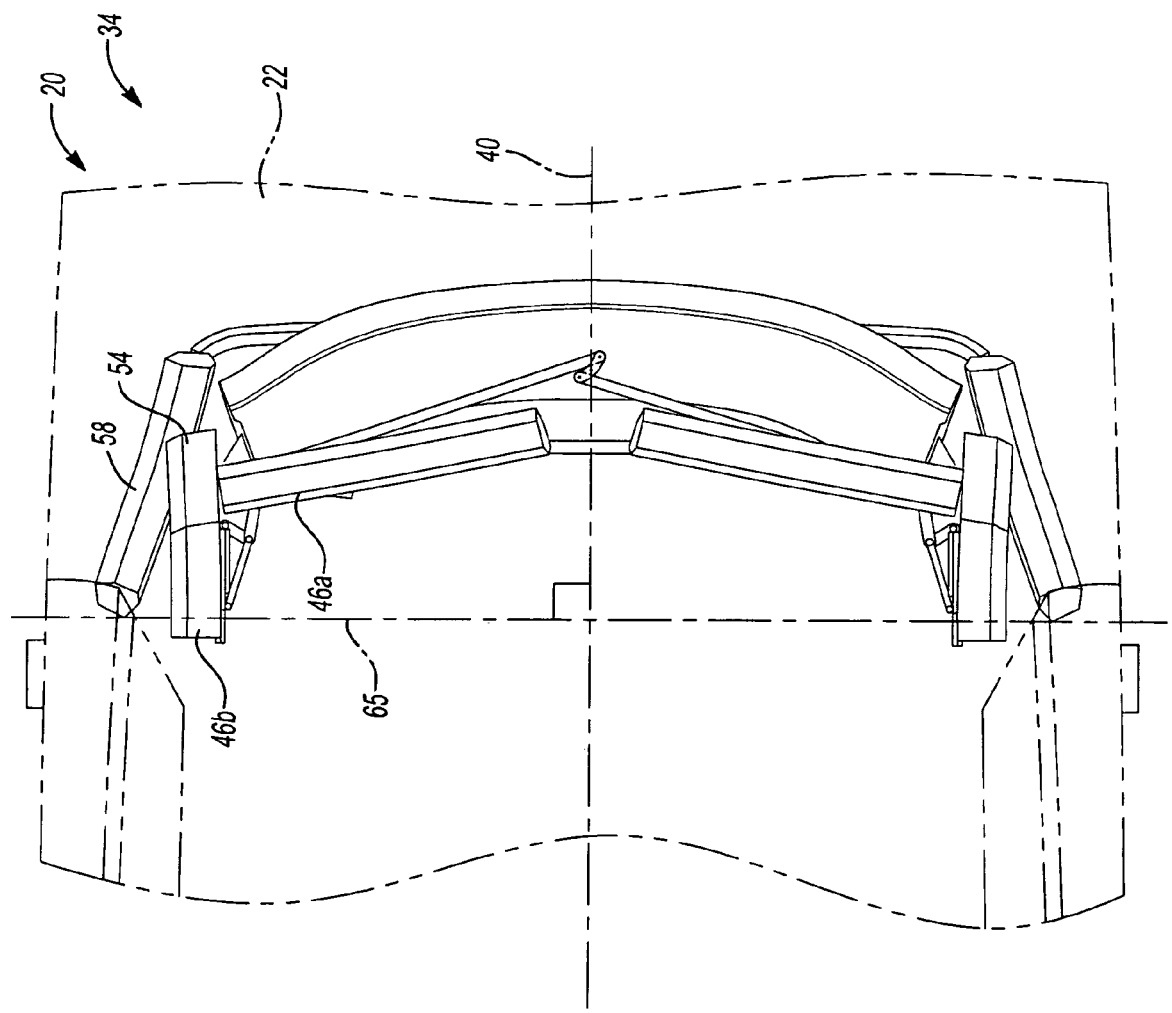

In operation, convertible roof 20 is movable between the raised position, shown in FIG. 1, through intermediate positions, such as those shown in FIGS. 2A-2C, to a fully stowed position, as shown in FIGS. 3A and 3B. To move convertible roof 20 from the raised position to the stowed position, number one roof bow 44 is unlatched from the front header of vehicle 22. Actuators 71 are commanded to retract and pull on balance links 66, causing balance links 66 to rotate rearwardly. As balance links 66 rotate rearwardly, rear roof rails 58 pivot rearwardly about pivots 64 while center roof rails 54 pivot forwardly relative to rear roof rails 58 about pivots 60. Rearward rotation of rear roof rails 58 cause control links 72 to pull intermediate linkage assemblies 57 rearwardly.

The rearward pulling of intermediate linkage assemblies 57 causes pivots 76 to move rearwardly and second links 84 to rotate rearwardly relative to center roof rails 54 about pivots 86. First links 80 pull on straight-folding portions 46b, causing rearward rotation relative to center roof rails 54 about pivots 56. The movement of first links 80 pull coupling links 114 rearwardly relative to straight-folding portions 46b. Coupling links 114 pull in-folding linkage assemblies 52 rearwardly, causing in-folding portions 46a of front roof rails 46 to pivot inwardly about pivots 50 toward center line 40 of vehicle 22.

As in-folding portions 46a of front roof rails 46 pivot inwardly, the ends of first synchronizing links 120 attached to in-folding portions 46a also rotate inwardly about pivots 124 and second synchronizing links 126 approach one another and cause synchronizing crank 130 to rotate clockwise in the orientation shown in FIG. 2A. The movement of first and second synchronizing links 120, 126 allow synchronizing linkage assemblies 48 to constrain the in-folding of in-folding portions 46a of front roof rail 46 and draw number one roof bow 44 rearwardly. The constraining of the in-folding of in-folding portions 46a prevents top stack mechanism 34 from drifting side-to-side during the retraction and extension processes, thereby enabling smooth and aesthetically pleasing operation of convertible roof 20. Actuators 71 continue to retract until top stack mechanism 34 reaches its stowed position, as shown in FIGS. 3A and 3B, wherein convertible roof 20 is disposed within stowage compartment 30.

To move convertible roof 20 from its stowed position to its raised position, actuators 71 are commanded to extend in length and push on balance links 66 causing forward rotation about pivots 68. The forward rotation is transferred to center roof rails 54 and rear roof rails 58. As convertible roof 20 rises, rear roof rails 58 rotate forwardly about pivots 64 and center roof rails 54 rotate rearwardly relative to rear roof rails 58 about pivots 60. Control links 72 push intermediate linkage assemblies 57 forwardly, thereby causing straight-folding portions 46b of front roof rails 46 to rotate forwardly relative to center roof rails 54 about pivots 56. This action causes pivots 76 to approach pivots 56. Coupling links 114 push forwardly on in-folding linkage assemblies 52. In-folding portions 46a of front roof rails 46 rotate outwardly relative to straight-folding portions 46b about pivots 50.

First synchronizing links 120 pivot about pivots 122, 124 and approach in-folding portions 46a as top stack mechanism 34 approaches the fully raised position. Second synchronizing links 126 move away from one another and rotate synchronizing crank 130 counterclockwise in the orientation depicted in FIG. 2A. Actuators 71 continue to expand in length until top stack mechanism 34 has been moved to the fully raised position, as shown in FIG. 1. Number one roof bow 44 can then be latched to the front header of vehicle 22 to secure top stack mechanism 34 in the fully raised position.

While various aspects of convertible roof 20 and top stack mechanism 34 have been disclosed, it will be appreciated that many other variations may be employed without departing from the scope of the present invention. For example, the in-folding linkage assemblies 52 and intermediate linkage assemblies 57 can be more than four-bar linkages. Actuators 71 can be other than fluidic actuators, such as solenoids and rotary actuators among others. Furthermore, top stack mechanism 34 may be manually operated. Moreover, while pivots 64 and pivot axis 65 are shown as being fixed, it should be understood that pivots 64 and pivot axis 65 can move, such as when in a slot or when brackets 62 move, while still maintaining pivot axis 65 substantially perpendicular to center line 40. The exact location of the various pivots of top stack mechanism 34 can vary from the locations shown in drawings and still be within the scope of the present invention. Furthermore, the specific configurations and orientations of the various linkages and roof rails can have shapes that differ from those shown and still be within the scope of the present invention. Additionally, the roof can be stowed in the rear seating area of the passenger compartment.

Figure 6:
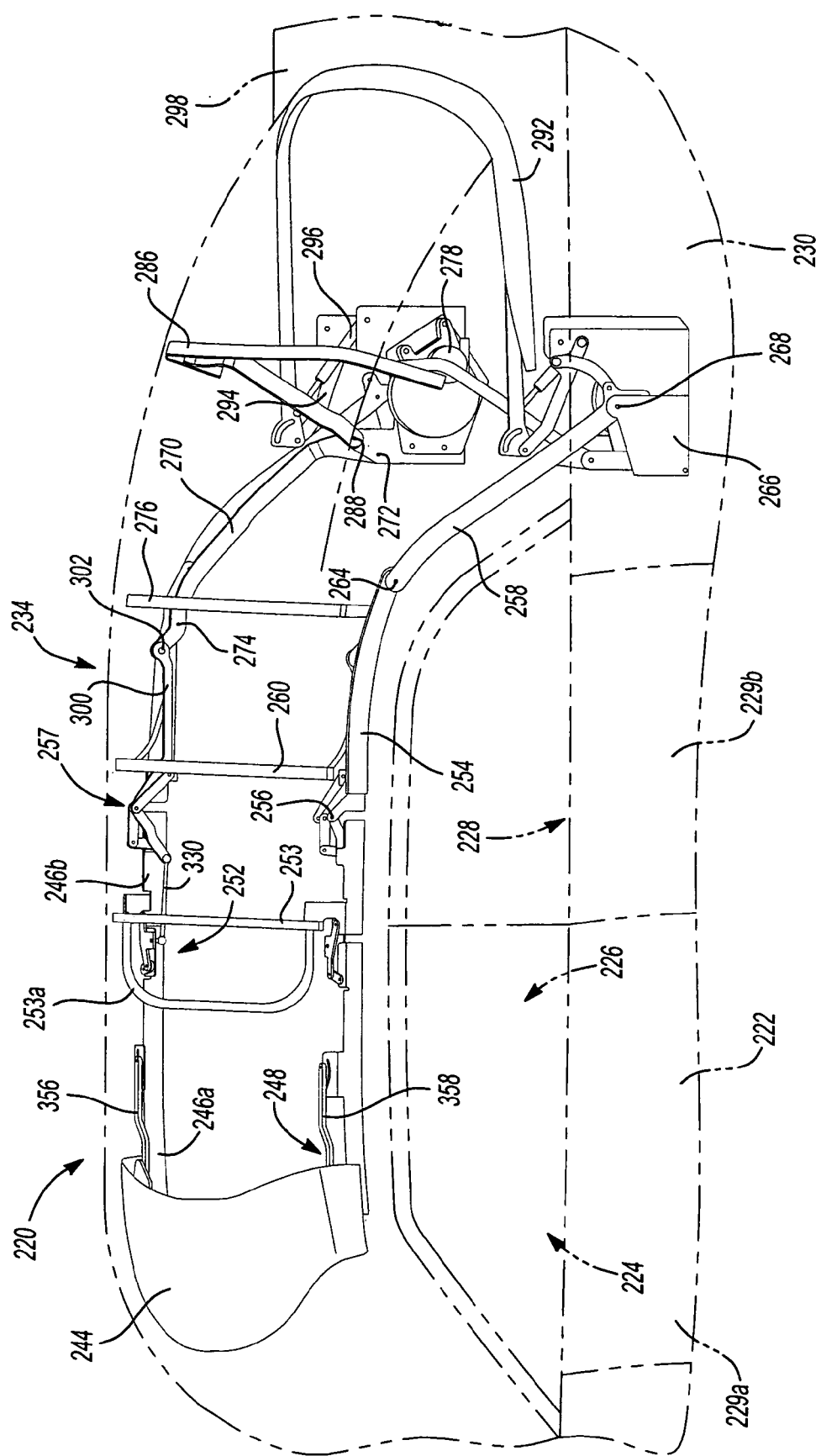
FIG. 6 is a perspective view of an automotive vehicle having a preferred embodiment of a convertible roof according to the principles of the present invention showing the convertible roof in the raised position.

Referring now to FIGS. 6-11C, the preferred embodiment of an in-folding convertible roof 220 according to the principles of the present invention is shown. Convertible roof 220 is employed on an automotive vehicle 222 having a passenger compartment 224 with front and rear passenger seating areas 226, 228 accessible by front and rear doors 229a, 229b and a generally U-shaped bootwell or stowage compartment 230. Stowage compartment 230 is positioned aft of passenger compartment 224 with quarter trim portions 232 extending along a portion of sides of passenger compartment 224. Convertible roof 220 utilizes a folding or top stack mechanism 234 and a roof cover 236 (shown in FIG. 7 only) and is operable between a fully raised position, as shown in FIG. 6, through intermediate positions, such as that shown in FIG. 7, to a fully stowed position, as shown in FIGS. 8A and 8B. Roof cover 236 is made from a pliable material, such as vinyl, canvas or a polyester fabric. If desired, roof cover 236 can include a hard or rigid portion that, optionally, can be covered by the same material that comprises the soft portion of the cover to give a uniform appearance. A backlight (not shown) is attached to roof cover 230 and is not pivotally coupled to top stack mechanism 234. The backlight can be made of either a rigid material, such as glass, or a pliable transparent material, such as vinyl.

In FIGS. 6-11C, convertible roof 220 and top stack mechanism 234 are shown symmetrical about a longitudinal, fore-and-aft center line 240 (shown in FIG. 8B) of vehicle 222. Center line 240, thus, also serves as a longitudinal center line for convertible roof 220 and top stack mechanism 234. Top stack mechanism 234 includes right and left roof linkages on the respective right and left sides of vehicle 222. For brevity, at times only one side of top stack mechanism 234 and convertible roof 220 may be shown and/or discussed. However, it should be understood that the other side linkages are also provided as part of top stack mechanism 234 and convertible roof 220 and are mirrored images of the side depicted and/or discussed. Also, when using the terms "fore" and "aft," "front" and "back," and "forward" and "rearward" in describing the movement and components of top stack mechanism 234 and convertible roof 220, such reference refers to the orientation of the components when top stack mechanism 234 and convertible roof 220 are in the fully raised position.

Top stack mechanism 234 includes a number one roof bow 244 that extends transversely across vehicle 222 and is disposed above the front windshield header when in the fully raised position, as shown in FIG. 6. Roof cover 236 is attached to number one roof bow 244. Number one roof bow 244 is coupled to a pair of segmented front roof rails 246 by synchronizing linkage assemblies 248, described in more detail below.

Segmented front roof rails 246 include an in-folding portion 246a and a straight-folding portion 246b. In-folding and straight-folding portions 246a, 246b are pivotally connected together at pivots 250 and are interconnected by in-folding linkage assemblies 252, described in more detail below. A number two roof bow 253 is fixedly attached to a front portion of straight-folding portions 246b. Number two roof bow 253 includes a U-shaped extension 253a (shown in FIG. 6 only) that extends forwardly from the main section. Extension 253a supports roof cover 236 and prevents roof cover 236 from interfering with the operation of synchronizing linkage assemblies 248 during the retraction and extension of convertible roof 220. Straight-folding portions 246b are pivotally connected to front portions of a pair of center roof rails 254 at pivots 256 and are interconnected with intermediate linkage assemblies 257, described in more detail below. A number three roof bow 260 extends transversely across vehicle 220 and is pivotally connected to intermediate portions of center roof rails 254 at pivots 262. Number three roof bow 260 is loosely attached to roof cover 236 and moves with the movement of roof cover 236.

Rear portions of center roof rails 254 are pivotally connected to front or top portions of rear roof rails 258 at pivots 264. The opposite ends of rear roof rails 258 are pivotally connected to fixed brackets 266 at pivots 268. Pivots 268 are aligned along a pivot axis 269 which is generally perpendicular to longitudinal center line 240. Rear roof rails 258 rotate about pivots 268 and pivot axis 269 during extension and retraction of top stack mechanism 234, as describe below. Brackets 266 are fixed to vehicle 222 within stowage compartment 230.

One end of a balance link 270 is pivotally coupled to bracket 266 at pivot 272 while an opposite end of balance link 270 is pivotally coupled to a rear portion of center roof rail 254 at pivot 274. The interconnection between center roof rail 254, rear roof rail 258, bracket 266 and balance link 270 forms a rear four-bar linkage assembly 275 defined by pivots 264, 268, 272 and 274. A number four roof bow 276 extends transversely across vehicle 220 and is fixedly attached to a front or top portion of balance link 270. An actuator 278 is attached to bracket 266 and coupled to balance link 270. Actuator 278 includes an electric motor 280 and a gear box 282. A linkage assembly 284 interconnects gear box 282 with balance link 270 thereby enabling actuator 278 to cause balance link 270 to rotate about pivot 272. Rotation of balance link 270 about pivot 272 causes convertible roof 220 to move between the raised and stowed positions, as described in more detail below.

A number five roof bow 286 extends transversely across vehicle 222 and is pivotally coupled to brackets 266 at pivots 288. Number five roof bow 286 is attached to roof cover 236 and moves with the movement of roof cover 236. A number six or rearmost roof bow 292 extends transversely across vehicle 222 and is pivotally coupled to brackets 266 with connecting links 294. One end of a connecting link 294 is pivotally coupled to an end of number six roof bow 292 while the opposite end of connecting link 294 is pivotally coupled to bracket 266. An actuator 296, in this case in the form of a fluidic actuator, is pivotally coupled to bracket 266 and to number six roof bow 292. Extension of actuator 296 causes number six roof bow 292 to rotate upwardly and forwardly and retraction of actuator 296 causes number six roof bow 292 to move downwardly and rearwardly, as described in more detail below. Number six roof bow 292 is also coupled to linkage assembly 284 to allow actuator 278 to move number six roof bow 292 into and out of stowage compartment 230. A rear portion of roof cover 236 is attached to number six roof bow 292. Number six roof bow 292 rests on a moveable tonneau cover 298 of vehicle 222 when convertible roof 220 is in the raised position, as shown in FIG. 6.

Rear linkage assembly 275 and intermediate linkage assembly 257 are interconnected by a control link 300. One end of control link 300 is pivotally connected to an end of balance link 270 at pivot 302. An opposite end of control link 300 is pivotally connected to intermediate linkage assembly 257 at pivot 304. Control link 300 causes intermediate linkage assembly 257 to rotate front roof rails 246 relative to center roof rails 254 during extension and retraction of top stack mechanism 234, as described in more detail below.

Figure 9A:
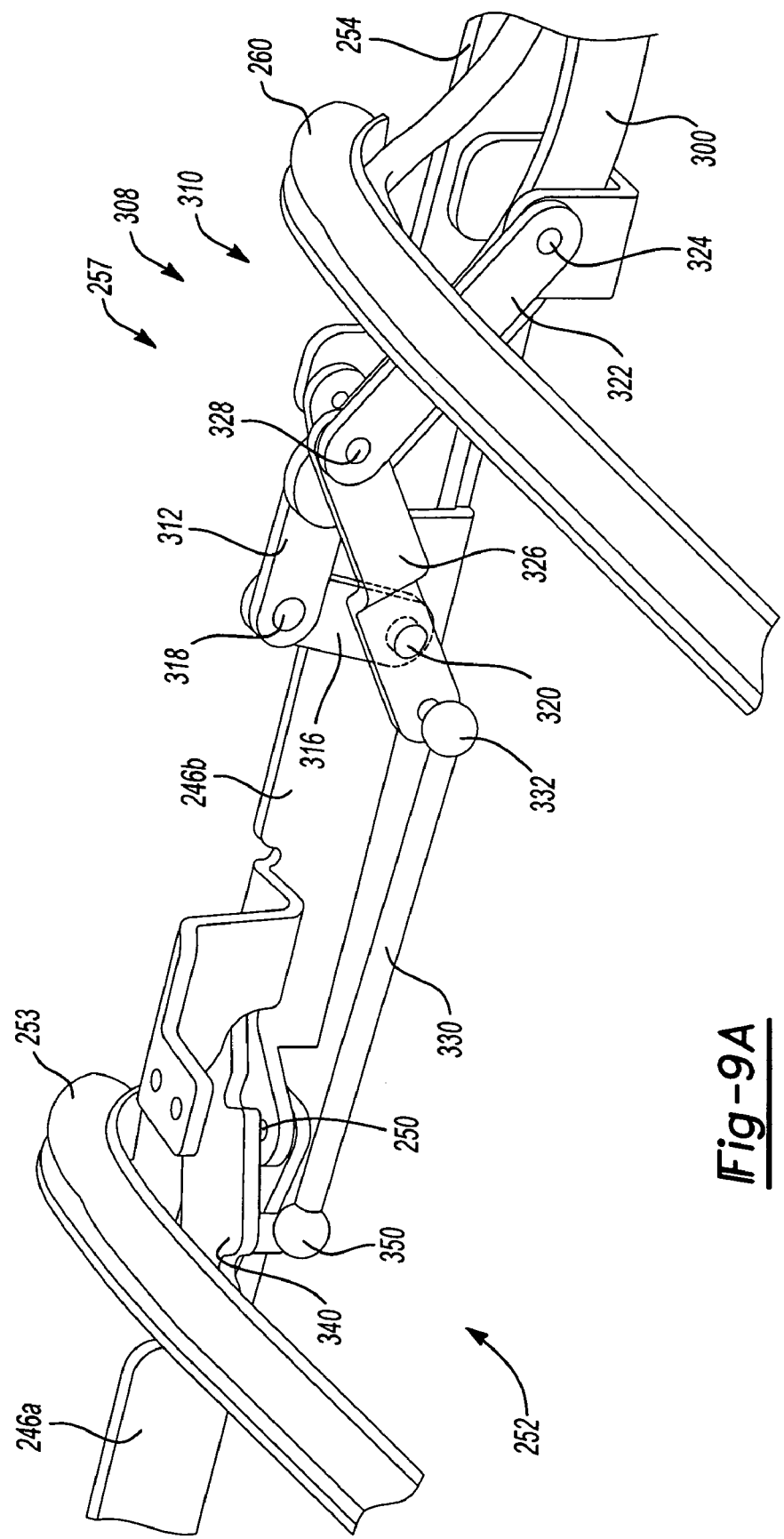
FIGS. 9A and 9B are fragmented perspective views of a portion of the convertible roof of FIG. 6 respectively in a raised position and partially retracted position showing the linkage assemblies between the center and front roof rails and between the segmented portions of the front roof rail.
Figure 9B:
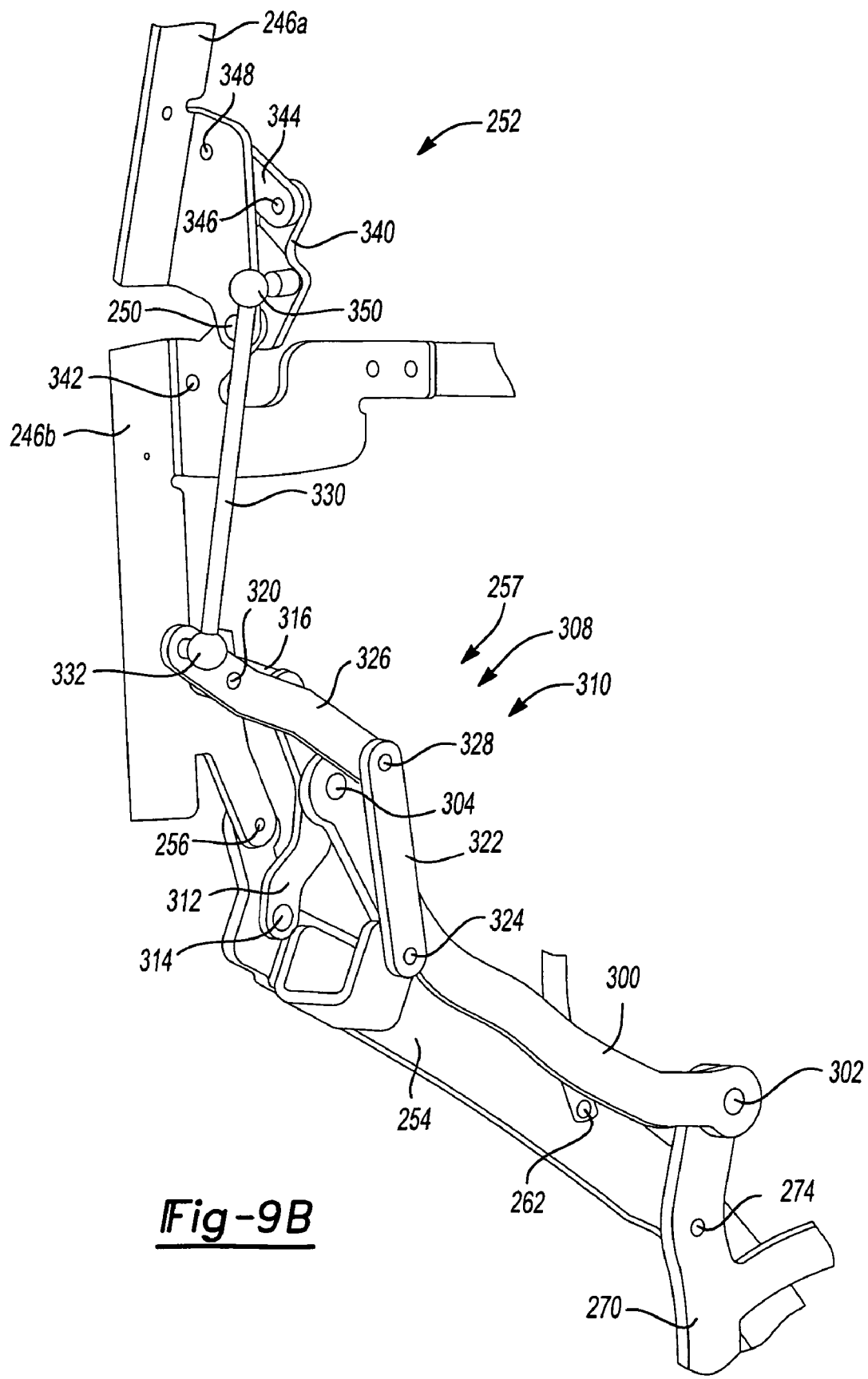

Intermediate linkage assembly 257, as best seen in FIGS. 9A and 9B, interconnects straight-folding portion 246b of front roof rail 246 with center roof rail 254. Intermediate linkage assembly 257 includes a straight-folding linkage assembly 308 and an in-folding control linkage assembly 310. Straight-folding linkage assembly 308 includes a first link 312 having one end pivotally coupled to a front portion of center roof rail 254 at pivot 314 and a second end pivotally coupled to a second link 316 at pivot 318. The end of control link 300 is pivotally connected to an intermediate portion of first link 312 at pivot 304. The opposite end of second link 316 is pivotally connected to a rear portion of straight-folding portion 246b of front roof rail 246 at pivot 320. Straight-folding linkage assembly 308 thereby forms a four-bar linkage assembly including straight-folding portion 246b, center roof rail 254, first link 312 and second link 316 and is defined by pivots 256, 314, 318 and 320. Straight-folding linkage assembly 308 controls the movement of front roof rail 246 relative to center roof rail 254 during movement of top stack mechanism 234 between the raised and stowed positions, as described below.

In-folding control linkage assembly 310 includes a first link 322 having one end pivotally connected to a front portion of center roof rail 254 at pivot 324 and an opposite end pivotally connected to an end of a second link 326 at pivot 328. An intermediate portion of second link 326 is pivotally connected to a rear portion of straight-folding portion 246b of front roof rail 246 at pivot 320 (which is also shared with link 316). An opposite end of second link 326 is coupled to a coupling link 330 at ball joint 332. Coupling link 330 is also coupled to in-folding linkage assembly 252 and interconnects in-folding linkage assembly 252 with in-folding control linkage assembly 310, as described in more detail below. In-folding control linkage assembly 310 thereby forms a four-bar linkage assembly including straight-folding portion 246b, center roof rail 254, first link 322 and second link 326 and is defined by pivots 256, 324, 328 and 320. In-folding control linkage assembly 310 is driven by movement of straight-folding portion 246b relative to center roof rail 254. The movement of straight-folding portion 246b relative to center roof rail 254 is controlled by straight-folding linkage assembly 308. Thus, movement of in-folding control linkage assembly 310 is driven by the movement of straight-folding linkage assembly 308, as described in more detail below.

Figure 10:
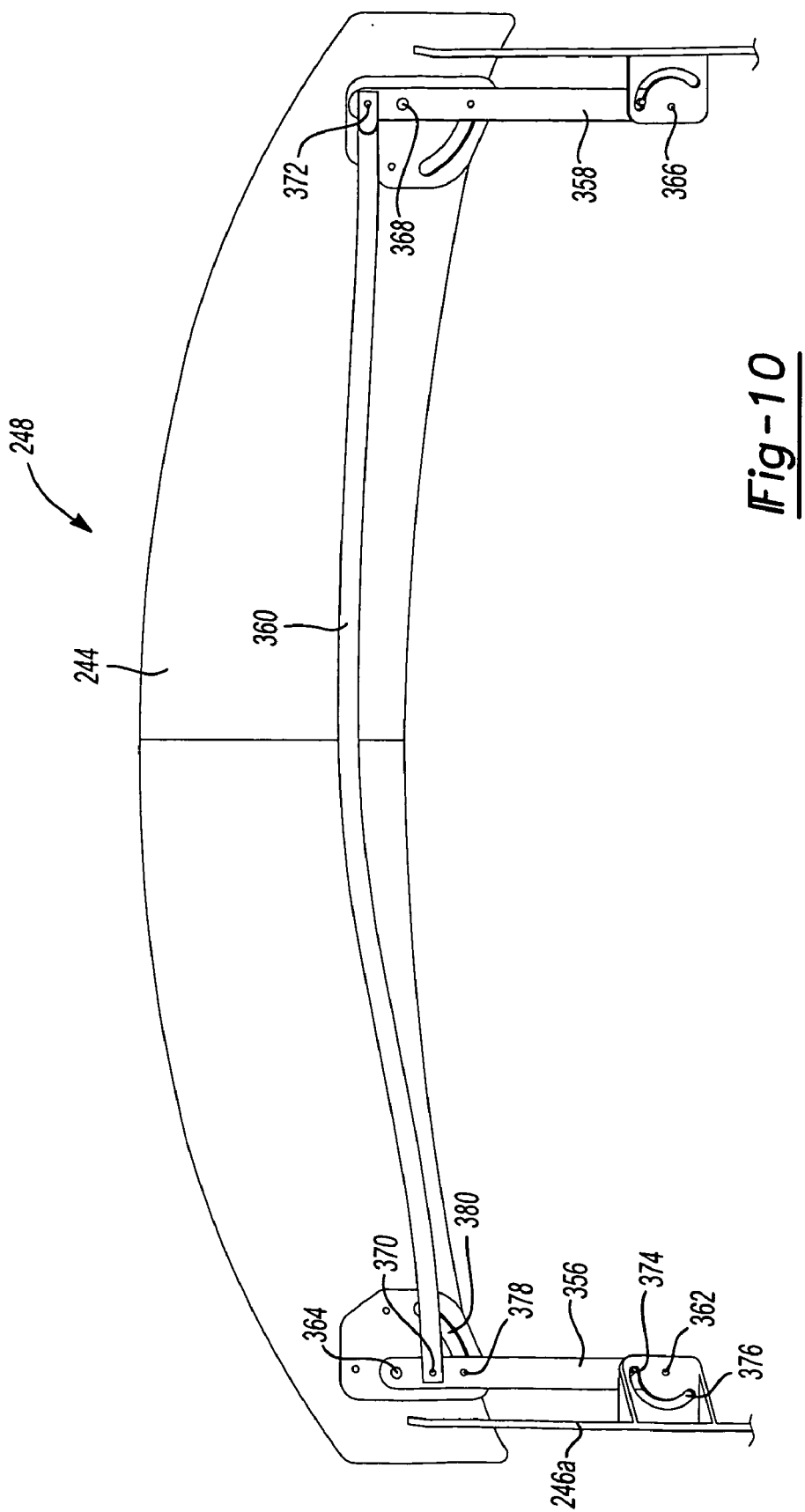
FIG. 10 is a bottom plan view of the front portion of the convertible roof of FIG. 6 showing the details of the synchronizing linkage assemblies when the convertible roof is in the raised position.

Referring now to FIGS. 9A, 9B and 10, details of in-folding linkage assembly 252 are shown. In-folding linkage assembly 252 includes a first in-folding link 340 having one end pivotally connected to straight-folding portion 246b of front roof rail 246 at pivot 342 and an opposite end pivotally connected to an end of a second in-folding link 344 at pivot 346. The opposite end of second in-folding link 344 is pivotally connected to in-folding portion 246a of front roof rail 246 at pivot 348. In-folding linkage assembly 252 thereby forms a four-bar linkage assembly including straight-folding portion 246b, in-folding portion 246a, second in-folding link 344 and first in-folding link 340 and is defined by pivots 250, 348, 346 and 342. In-folding linkage assembly 252 controls the movement of in-folding portion 246a relative to straight-folding portion 246b during the extension and retraction of top stack mechanism 234, as described in more detail below. In-folding linkage assembly 252 is driven by movement of coupling link 330. It should be noted that in-folding linkage assembly 252 operates in a plane that is perpendicular to the plane that intermediate linkage assembly 257 operates in. That is, when viewed in the orientation shown in FIG. 6, in-folding linkage assembly 252 operates in a generally horizontal plane while intermediate linkage assemblies 257 (including straight-folding linkage assembly 308 and in-fold control linkage assembly 310) operate in a generally vertical plane.

Coupling link 330 interconnects in-folding linkage assembly 252 with in-folding control linkage assembly 310. One end of coupling link 330 is connected to an end of link 326 at ball joint 332 while an opposite end of coupling link 330 is connected to an intermediate portion of first in-fold link 340 at ball joint 350. Ball joints 332, 350 allow three degrees of movement of coupling link 330 relative to links 326 and 340 and accommodates the differing planar movements. Coupling link 330 transfers the motion of in-folding control linkage assembly 310 to in-folding linkage assembly 252 to control and coordinate the extension and retraction of top stack mechanism 234, as described in more detail below.

Figure 7:
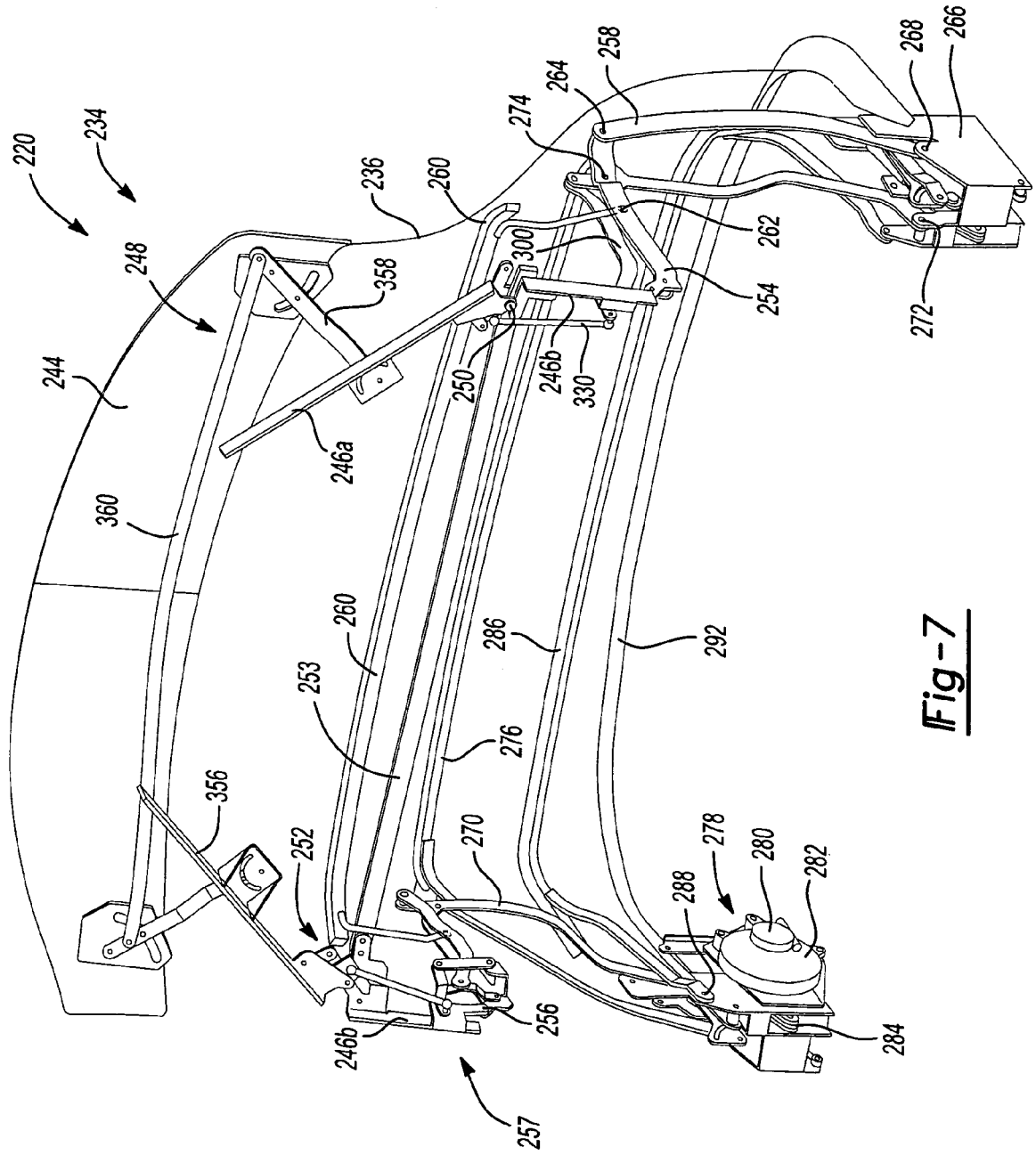
FIG. 7 is a perspective view of the convertible roof of FIG. 6 in an intermediate position between the raised and stowed positions.

Referring now to FIGS. 7 and 10, details of synchronizing linkage assembly 248 are shown. Synchronizing linkage assembly 248 includes right and left links 356, 358, that are disposed along the respective right and left sides of top stack mechanism 234, and a synchronizing link 360 that interconnects right and left links 356, 358. One end of right link 356 is pivotally connected to an inwardly extending extension on the right side in-folding portion 246a of front roof rail 246 at pivot 362 while an opposite end of right link 356 is pivotally connected to a right side portion of number one roof bow 244 at pivot 364. One end of left link 358 is pivotally connected to an inwardly extending extension on the left side in-folding portion 246a of front roof rail 246 at pivot 366 while an intermediate portion (near the opposite end) of left link 358 is pivotally coupled to the left side portion of number one roof bow 244 at pivot 368. Pivots 364 and 368 on number one roof bow are generally aligned with one another. That is, a line connecting pivots 364, 368 is generally perpendicular to the fore-aft center line 240. One end of synchronizing link 360 is pivotally connected to an intermediate portion of right link 356 at pivot 370 slightly rearward of pivot 364, while an opposite end of synchronizing link 360 is pivotally connected to the end of left link 358 at pivot 372 forward of pivot 368. With one end of the synchronizing link 360 being pivotally coupled to right link 356 rearwardly of pivot 364 while the opposite end of synchronizing link 360 is pivotally coupled to left link 358 forward of pivot 368, synchronizing link 360 operates to synchronize the movement of the left and right in-folding portions 246a of front roof rail 246. That is, synchronizing link 360 limits the degrees of freedom of number one roof bow 244 relative to in-folding portions 246a of front roof rails 246 and prevents cross-car drift of top stack mechanism 234 during movement between the raised and stowed positions.

To reduce some of the stress at pivots 362, 364, 366 and 368, slotted connections with pins that ride therein are provided. Specifically, right and left links 356, 358 each have a pin 374 that rides within slots 376 on the respective right and left in-folding portions 246a. Similarly, right and left links 356, 358 also each have a pin 378 that rides within slots 380 on the respective right and left sides of number one roof bow 244. Engagement between pins 374, 378 and slots 376, 380 provides additional support for right and left links 356, 358, number one roof bow 244 and the right and left in-folding portions 246a. The engagement between these slots and the pins does not affect the kinematics of the operation of synchronizing linkage assembly 248.

Figure 11A:
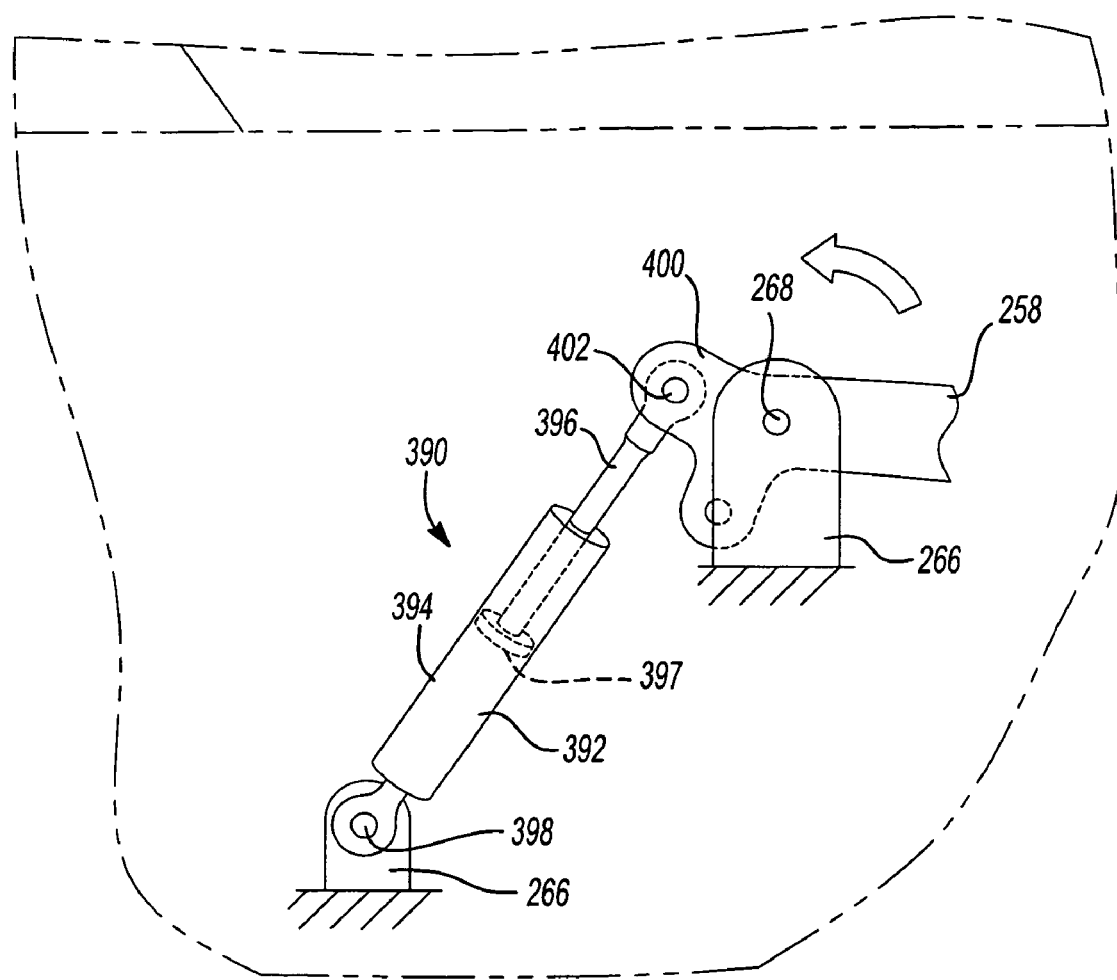
FIGS. 11A-C are side fragmented simplified cutaway views illustrating the attachment of the rear roof rail to the fixed pivot and the damper attached to the rear roof rail of the convertible roof of FIG. 6 in a stowed, intermediate and raised position, respectively.
Figure 11B:
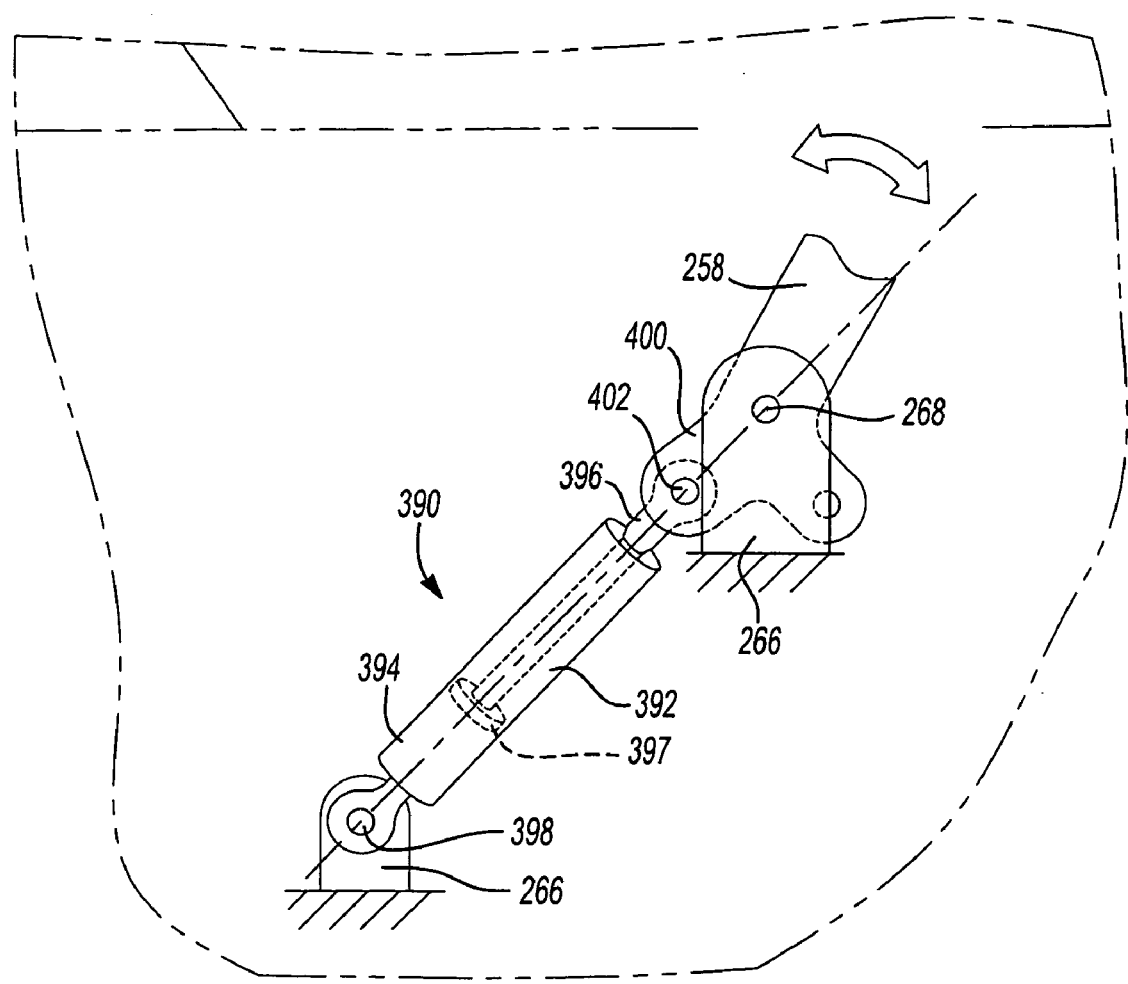
Figure 11C:
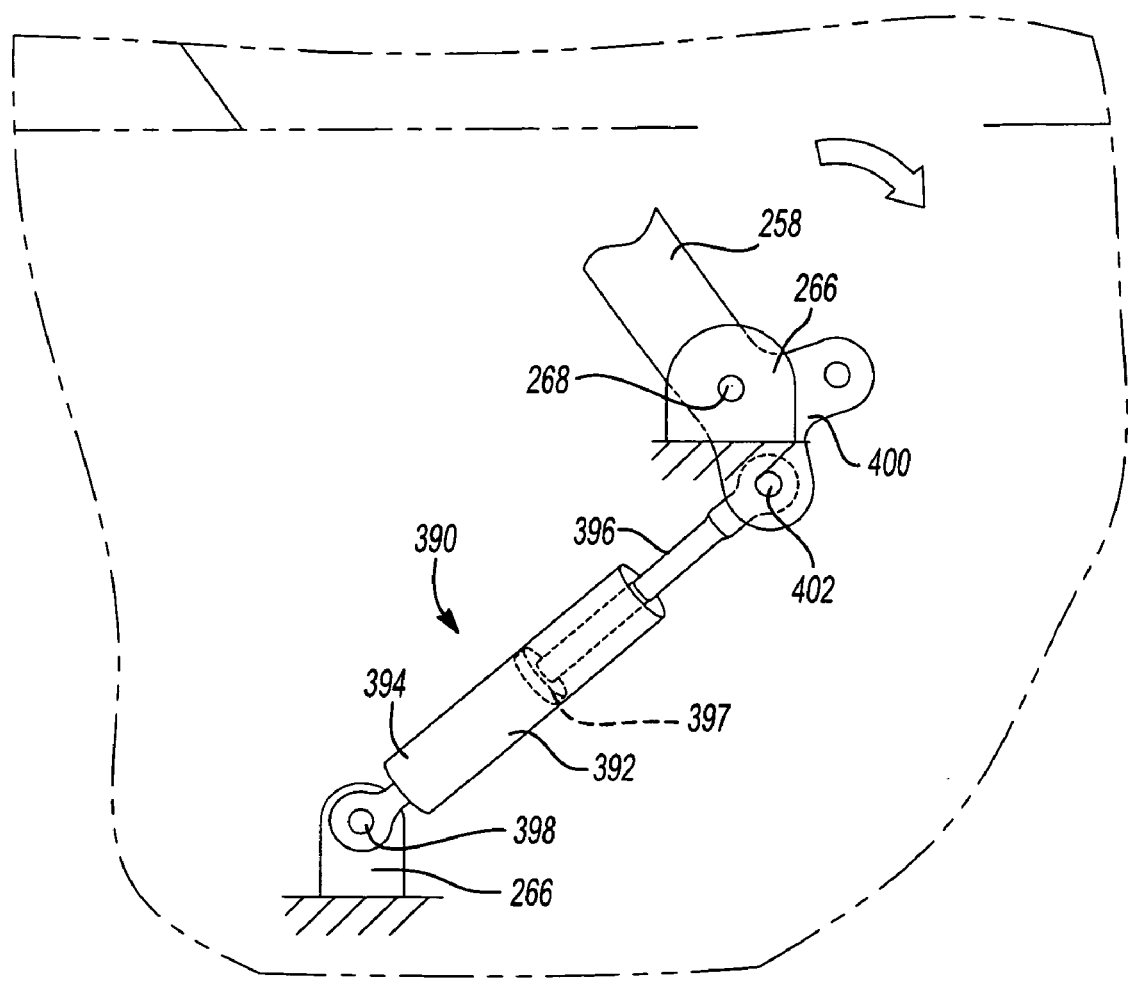

Referring now to FIGS. 11A-11C, simplified details of a dampening system 390 used with convertible roof 220 are shown. Dampening system 390 is located within brackets 266 and is operable to dampen the motion of top stack mechanism 234 at various times during the extending and retracting of convertible roof 220, as described in more detail below. The views depicted in FIGS. 11A-11C are simplified and a majority of bracket 266 and the other components therein or attached thereto are removed for ease of illustration and explanation. Dampening system 390 includes a damper 392 that dampens some movements of top stack mechanism 234 while allowing unimpeded (undampened) movement of top stack mechanism 234 during other movements. Damper 392 includes a cylindrical housing 394 with an extendable rod 396 extending therefrom. A piston 397 is attached to rod 396 inside cylindrical housing 394. A fluid, in this case hydraulic fluid, is also contained within housing 394. The hydraulic fluid dampens the movement of rod 396 (via the piston) relative to housing 394. The movement of rod 396 is dampened only in one direction. That is, rod 396 is relatively free to be moved into housing 394 while being restrained or dampened when being moved outwardly from housing 394. Thus, movement of top stack mechanism 234 that causes damper 392 to shorten in length is not dampened while movement of top stack mechanism 234 that causes damper 392 to be elongated is dampened, as described in more detail below. A suitable damper 392 is a model MB-22 hydraulic damper available from Ace Controls Inc. of Farmington Hills, Mich.

One end of damper 392 is pivotally connected to bracket 266 at pivot 398 while an opposite end of damper 392 is pivotally connected to a bottom extension 400 of rear roof rail 258 at pivot 402. The orientation of pivot 402 relative to pivot 268 (about which rear roof rails 258 rotate) causes damper 392 to be both shortened and elongated during the movement of top stack mechanism 234 between the raised and stowed positions. As shown in FIG. 11A, when convertible roof 220 and top stack mechanism 234 are in the fully stowed position, pivot 402 is forward of pivot 268. As top stack mechanism 234 moves from the stowed position toward the raised position (rear roof rail 258 rotating counter-clockwise in the views of FIGS. 11A-11C), rod 396 will be pushed into cylindrical housing 394 and damper 392 will offer little or no resistance to this motion. Rod 396 will continue to be pushed into housing 394 until an on-center position occurs, as shown in FIG. 11B, wherein pivots 398, 402 and 268 are all aligned with one another. Further movement of convertible roof 220 and top stack mechanism 234 toward the raised position causes damper 392 to move away from the on-center position and pull rod 396 out from housing 394. The pulling of rod 396 out from housing 394 is dampened by the engagement between piston 397 and the hydraulic fluid therein. Thus, during continued motion of top stack mechanism 234 toward the raised position (after damper 392 has passed the on-center position), the movement is dampened by the resistance of rod 396 from being pulled from housing 394. This dampening helps support top stack mechanism 234 and relieves some stress from actuators 278, linkage assemblies 284 and the other components of top stack mechanism 234. Furthermore, this dampening helps diminish the force and velocity with which number one roof bow 244 may contact the front header of vehicle 222. When in the fully raised position, pivot 402 is located below and rearward of pivot 268, as shown in FIG. 11C.

During the movement of convertible roof 220 and top stack mechanism 234 from the raised position (FIG. 11C) to the stowed position (FIG. 11A), the initial movement of rear roof rail 258 will push rod 396 into housing 394 while damper 392 offers little or no resistance to this movement. This pushing of rod 396 into housing 394 continues until an on-center position is reached, as shown in FIG. 11B. Continued rearward rotation of rear roof rail 258 about pivot 268 causes damper 392 to pass the on-center position and extension 400 to begin to pull on rod 396. The movement of rod 396 out of housing 394 is resisted by the engagement between the piston and the hydraulic fluid thereby dampening the continued rearward rotation of rear roof rail 258 toward the stowed position. Damper 392 thereby removes some of the stresses and strains on actuator 278, linkage assemblies 284 and other components of top stack mechanism 234 during the final phases of movement of top stack mechanism 234 to the stowed position. Additionally, the dampening helps limit the force and velocity of top stack mechanism 234 into stowage compartment 230.

Figure 8B:
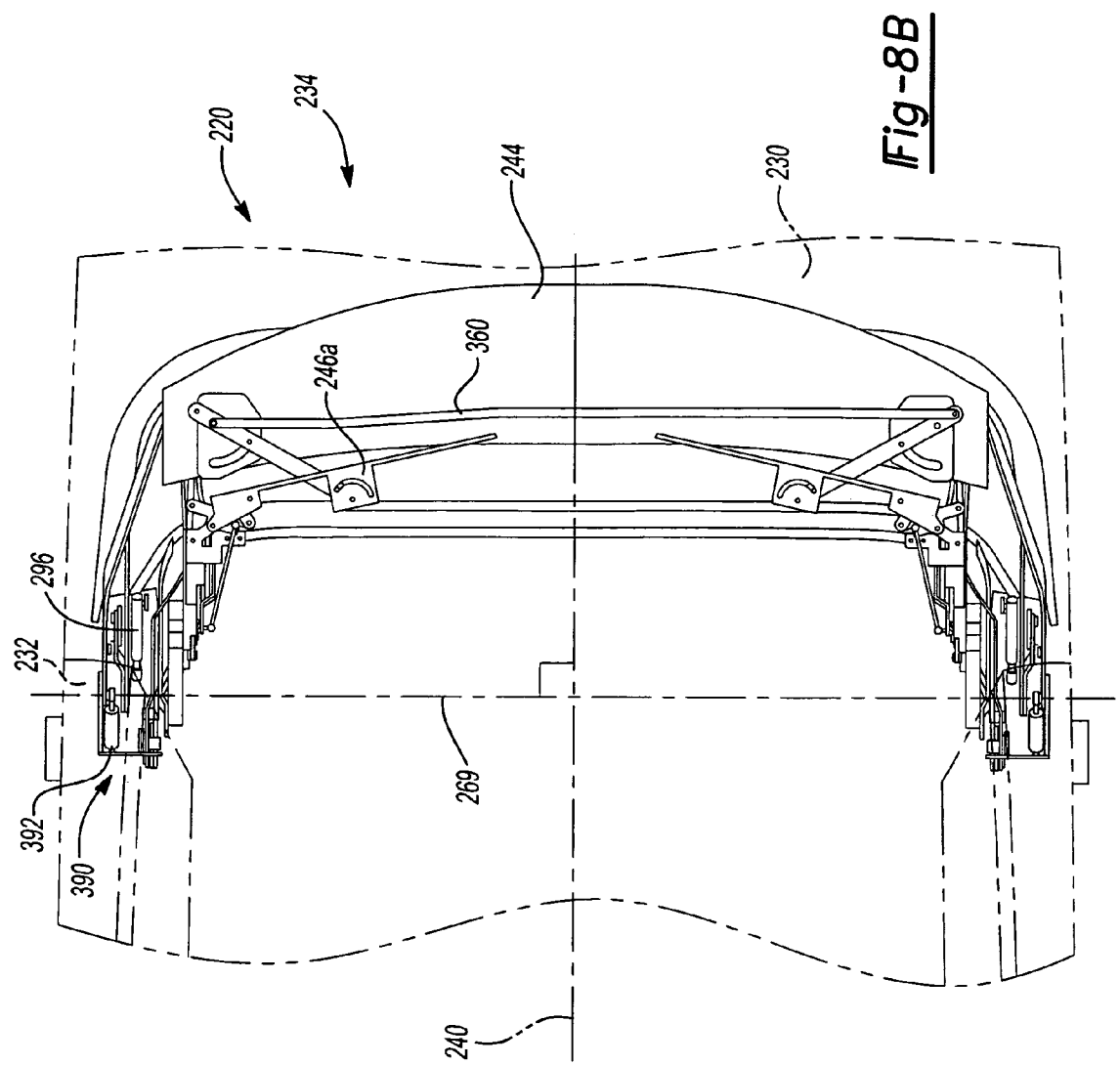

In operation, convertible roof 220 is moveable between the raised position, shown in FIG. 6, through intermediate positions, such as that shown in FIG. 7, to a fully stowed position, as shown in FIGS. 8A and 8B. To move convertible roof 220 from the raised position to the stowed position, number one roof bow 244 is unlatched from the front header of vehicle 222. Actuators 296 are commanded to extend thereby pushing number six roof bow 292 upwardly. When number six roof bow 292 has been pushed upwardly a sufficient distance, tonneau cover 298 can then be moved from the closed position to an open position (not shown). Actuators 296 are commanded to retract and pull on number six roof bow 292 causing number six roof bow 292 to return to its nominal position. With tonneau cover 298 in the open position, access to stowage compartment 230 is available and convertible roof 220 can be retracted into stowage compartment 230. Actuators 278 are commanded to drive linkage assemblies 284 and pull on balance links 270, causing balance links 270 to rotate rearwardly. As balance links 270 rotate rearwardly, rear roof rails 258 pivot rearwardly about pivots 268 while center roof rails 254 rotate forwardly relative to rear roof rails 258 about pivots 264. Rearward rotation of balance links 266 also cause control links 300 to pull straight-folding linkage assemblies 308 rearwardly. Movement of linkage assembies 284 also cause number six roof bow 292 to move downwardly and into stowage compartment 230.

The rearward pulling on straight-folding linkage assemblies 308 cause links 312 to rotate rearwardly about pivots 314 relative to center roof rails 254. This movement of links 312 pull on links 316 which in turn cause straight-folding portions 246b to rotate rearwardly relative to center roof rails 254 about pivots 256.

The rearward rotation of straight-folding portions 246b relative to center roof rails 254 cause pivots 328 that interconnect links 322 and 326 of in-folding control linkage assembly 310 to also move rearwardly. This in turn pulls coupling links 330 rearwardly relative to straight-folding portions 246b. The rearward movement of coupling links 330 pulls in-folding linkage assemblies 252 rearwardly, causing in-folding portions 246a of front roof rails 246 to pivot inwardly about pivots 250 toward center line 240 of vehicle 222. It should be noted that the rearward movement of in-folding linkage assemblies 252 are in planes that are perpendicular to the planes of the rearward movement of intermediate linkage assemblies 257.

As in-folding portions 246a of front roof rails 246 pivot inwardly, the ends of right and left links 256, 258 that are pivotally connected to in-folding portions 246a rotate inwardly about their respective pivots 364, 368 on number one roof bow 244. Due to the offset arrangement of pivots 370, 372 that interconnect synchronizing link 360 to right and left links 356, 358, synchronizing link 360 moves toward the left side of top stack mechanism 234. Synchronizing link 360 constrains the in-folding of in-folding portions 246a of front roof rails 246 as number one roof bow 244 is pulled rearwardly. The constraining of the in-folding movement prevents top stack mechanism 234 from drifting side-to-side during the retraction and extension process, thereby enabling smooth and aesthetically pleasing operation of convertible roof 220.

During the later portion of the retraction cycle (after dampers 392 go over-center), dampening system 390 via dampers 392 resist the movement of top stack mechanism 234 which dampens and slows the movement of top stack mechanism 234, as describe above. Actuators 278 continue to cause top stack mechanism 234 to retract into stowage compartment 230 until the stowed position is reached, as shown in FIGS. 8A and 8B, wherein convertible roof 220 is disposed within stowage compartment 230. Tonneau cover 298 is then moved back to its closed position covering an entirety or a portion of convertible roof 220 within stowage compartment 230.

To move convertible roof 220 from its stowed position to its raised position, tonneau cover 298 is moved from the closed position to the open position and actuators 278 are commanded to cause linkage assemblies 284 to push on balance links 270 causing forward rotation about pivots 272. The forward rotation is transferred to center roof rails 254 and rear roof rails 258. Additionally, linkage assemblies 284 cause number six roof bow 292 to move upwardly and out of stowage compartment 230. As convertible roof 220 extends, rear roof rails 258 rotate forwardly about pivots 268 and center roof rails 254 rotate rearwardly relative to rear roof rails 258 about pivots 264. Control links 300 push intermediate linkage assemblies 257 forwardly, thereby causing straight-folding portions 246b of front roof rails 246 to rotate forwardly relative to center roof rails 254 about pivots 256. This action causes pivots 304, 328 to approach pivots 256. Coupling links 330 push forwardly on in-folding linkage assemblies 252. In-folding portions 246a of front roof rails 246 rotate outwardly relative to straight-folding portions 246b about pivots 250.

The outward rotation of in-folding portions 246a cause right and left links 356, 358 to rotate outwardly about their respective pivots 364, 368. This in turn causes synchronizing link 360 to move toward the right relative to vehicle 222. Synchronizing link 360 constrains the out-folding of in-folding portions 246a of front roof rails 246 as number one roof bow 244 is pushed forwardly. The constraining of the out-folding movement prevents top stack mechanism 234 from drifting side-to-side during the extension cycle, thereby enabling smooth and aesthetically pleasing operation of convertible roof 220.

During the later portion of the extension cycle (after dampers 392 go over-center), dampening system 390 via dampers 392 resist the movement of top stack mechanism 234 which dampens and slows the movement of top stack mechanism 234, as describe above. Additionally, the force with which number one roof bow 244 may contact the front header of vehicle 222 is also reduced. Actuators 278 continue to cause balance links 270 to rotate forwardly until top stack mechanism 234 has been moved to the fully raised position, as shown in FIG. 1. Actuators 296 are then commanded to extend and cause the rear portion of number six roof bow 292 to move upwardly and forwardly. When number six roof bow 292 has been moved a sufficient distance, tonneau cover 298 is then moved from the open position to the closed position. Actuators 296 are then commanded to retract and cause number six roof bow 292 to move downwardly and on top of tonneau cover 298 and into its nominal position. Number one roof bow 244 is then latched to the front header of vehicle 222 to secure top stack mechanism 234 in the fully raised position.

Figure 12A:
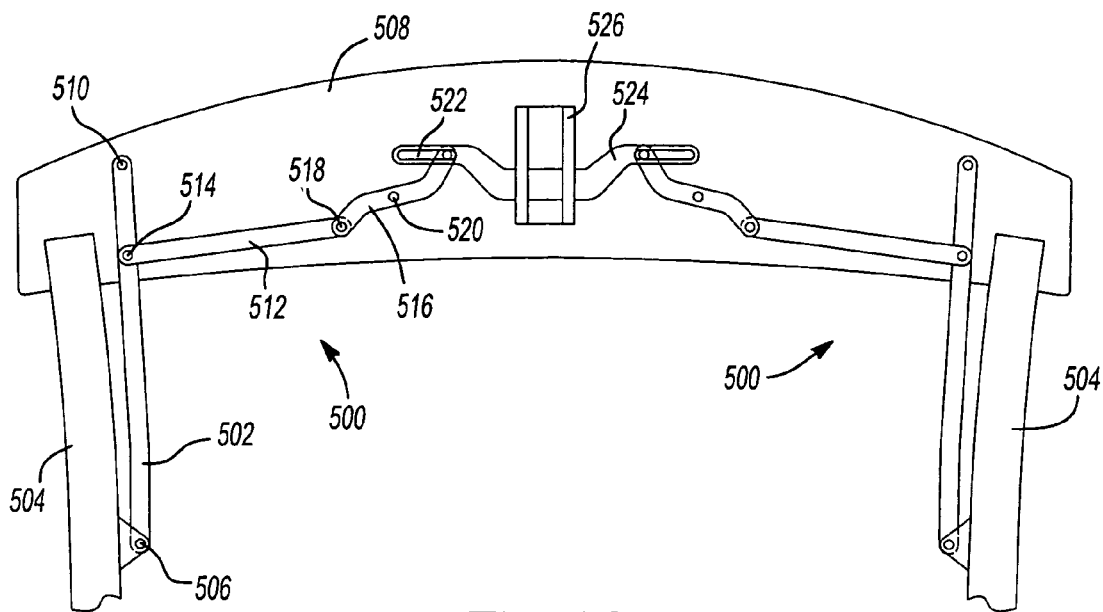
FIGS. 12A and 12B are bottom plane views of alternate embodiments of synchronizing linkage assemblies according to the principles of the present invention that can be used with an in-folding convertible roof.

Referring now to FIG. 12A, a second alternate embodiment of a synchronizing linkage assembly 500 for constraining the in-folding of a convertible roof is shown. The view depicted in FIG. 12A is a simplified bottom plan view of the front portion of the in-folding convertible roof system of FIG. 6 with synchronizing linkage assembles 500 thereon. Each synchronizing linkage assembly 500 includes an in-folding link 502 having one end pivotally connected to an in-folding portion 504 of a front roof rail at pivot 506 while the opposite end is pivotally connected to number one roof bow 508 at pivot 510. One end of a synchronizing link 512 is pivotally connected to an intermediate portion of in-folding link 502 at pivot 514 while an opposite end is pivotally connected to an end of a synchronizing crank 516 at pivot 518. An intermediate portion of synchronizing crank 516 is pivotally connected to number one roof bow 508 at pivot 520. The other end of synchronizing crank 516 is pivotally connected to a slide joint 522 on one end of a synchronizing slider 524. Synchronizing slider 524 is slidably connected to number one roof bow 508 in a slide channel 526 on number one roof bow 508. The slide joint 522 on the opposite end of synchronizing slider 524 is connected to an end of a synchronizing crank 516 on the other side of the number one roof bow 508. Slider 524 can move forwardly and rearwardly relative to number one roof bow 508 within slide channel 526.

During retraction of the convertible roof, the front ends of in-folding roof rail portions 504 rotate inwardly and cause the ends of in-folding links 502 attached to pivots 506 to rotate inwardly about pivots 510. The rotation of in-folding roof rail portions 504 also cause in-folding links 502 to move rearwardly and pull number one roof bow 508 rearwardly. The rotation of in-folding links 502 pushes synchronizing links 512 inwardly which cause synchronizing cranks 516 to rotate about pivots 520 and move pivots 518 rearwardly. The rotation of synchronizing cranks 516 via slide joints 522 push synchronizing slider 524 forwardly relative to number one roof bow 508 within slide channel 526. The interaction between in-folding links 502, synchronizing links 512, synchronizing crank 516 and synchronizing slider 524 constrain the movement of the top stack mechanism and keep the two sides of the top stack mechanism in sync during the retraction cycle. The interaction also prevents cross car drift. During the extension cycle of the top stack mechanism, the interactions are reversed and the movement of the top stack mechanism remains synchronized and constrained. Thus, synchronizing linkage assemblies 500 are operable to synchronize and constrain the movement of the top stack mechanism during retraction and extension cycles.

Figure 12B:
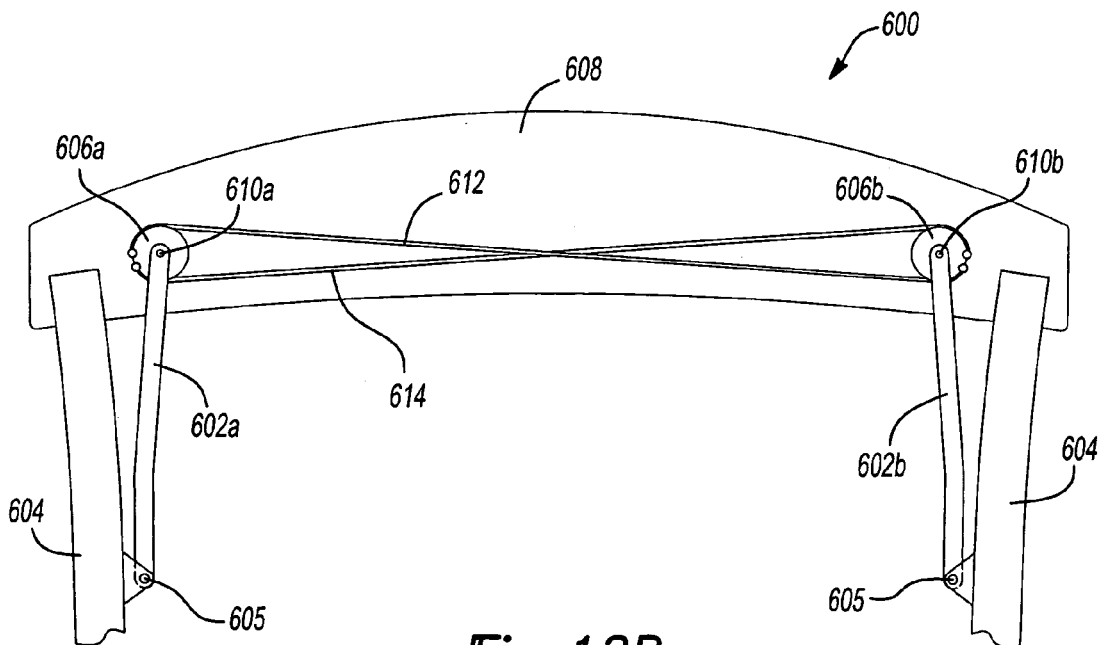

Referring now to FIG. 12B, a third alternate embodiment of a synchronizing linkage assembly 600 for constraining the in-folding of the convertible roof is shown. The view depicted in FIG. 12B is a simplified bottom plan view of the front portion of the in-folding convertible roof system of FIG. 6 with synchronizing linkage assembly 600 thereon. Synchronizing linkage assembly 600 includes right and left side in-folding links 602a, 602b that have one end pivotally connected to in-folding roof rail portions 604 on the respective right and left sides of the top stack mechanism at pivots 605. The opposite ends of in-folding links 602a, 602b are fixed to respective right and left side pulleys 606a, 606b. Pulleys 606a, 606b are pivotally connected to respective right and left sides of number one roof bow 608 at respective pivots 610a, 610b. One end of first and second cables 612, 614 are each fixed to an outer portion (when the top stack mechanism is fully raised) of right pulley 606a while the other end of first and second cables 612, 614 are each fixed to an outer portion (when the top stack mechanism is fully raised) of left pulley 606b. First cable 612 extends around a front portion of right pulley 606a across the top stack mechanism and around a rear portion of left pulley 606b. In contrast, second cable 614 extends around a rear portion of right pulley 606a across the top stack mechanism and around a front portion of left pulley 606b. The opposite wrapping of cables 612, 614 allows synchronizing linkage assembly 600 to constrain the in-folding of the roof rail during retraction and extension of the top stack mechanism.

During retraction of the top stack mechanism, the front ends of in-folding roof rail portions 604 rotate inwardly and cause the ends of in-folding links 602a, 602b attached to pivots 605 to rotate inwardly. The rotation of in-folding roof rail portions 604 also cause in-folding links 602a, 602b to move rearwardly and pull number one roof bow 608 rearwardly. The rotation of in-folding links 602a, 602b cause the respective pulleys 606a, 606b to rotate in opposite directions (counter clockwise and clockwise respectively in the view depicted) about pivots 610a, 610b. The opposite rotation of pulleys 606a, 606b maintains the tension in cables 612, 614. Maintaining the tension in cables 612, 614 constrains the movement of the top stack mechanism and minimize cross car drift of the top stack mechanism during the retraction cycle. During the extension cycle of the top stack mechanism, the interactions are reversed and tension in cables 612, 614 remains the same and constrains the movement of the top stack mechanism. Thus, synchronizing linkage assembly 600 is operable to synchronize and constrain the movement of the top stack mechanism during retraction and extension cycles.

While various aspect of convertible roof 220 and top stack mechanism 234 have been disclosed, it will be appreciated that many other variations may be employed without departing from the scope of the present invention. For example, while actuators 278 are shown as being an electric motor 280 coupled to a gear box 282, other types of actuators could be employed. For example, linear actuators, such as fluidically-driven cylinders, can be employed. Furthermore, fluidically-driven rotary actuators could also be employed. Moreover, the use of the in-folding control linkage assembly 310 may be eliminated by configuring link 316 into a desired orientation and attaching control link 330 to second link 316, providing a desired motion can be translated to coupling link 330 via the movement of straight-folding linkage assembly 308.

Additionally, while pivots 268 and pivot axis 269 are shown as being fixed, it should be understood that pivots 268 and pivot axis 269 can move, such as when in a slot or when brackets 266 move, while still maintaining pivot axis 269 substantially perpendicular to center line 240. The exact location of the various pivots of top stack mechanism 234 can vary from the locations shown in drawings and still be within the scope of the present invention. Furthermore, the specific configurations and orientations of the various linkages and roof rails can have shapes that differ from those shown and still be within the scope of the present invention. Additionally, the roof can be stowed in the rear seating area of the passenger compartment.

Moreover, while dampening system 390 is shown as using a fluidic damper 392, it should be appreciated that other types of dampers could be employed. For example, a spring-loaded damper that resists elongation could be employed. Moreover, a curved rack and a biased pinion may also be employed. Furthermore, fluids other than hydraulic fluid could also be used for a fluidic damper. Moreover, the fluidic damper could connect to other components of top stack mechanism 234 to dampen the motion. For example, the damper could be coupled to the balance link or other components. Additionally, it should be appreciated that the dampening system of the present invention could also be employed on convertible roofs that do not include in-folding features and/or are shorter in length. Additionally, the dampening system could also be used on convertible roofs that utilize hard panels or rigid panels in lieu of or in addition to the soft roof cover. Additionally, the dampening system can employ dampers at different locations along the top stack mechanism to dampen different portions of the top stack mechanism and/or include multiple dampers spaced at different locations along the top stack mechanism.

It should also be appreciated that the in-folding aspects and the synchronizing linkage assemblies utilized in the present invention could be employed on a convertible roof system that utilizes more or less roof rails, such as a bi-fold top stack mechanism with a segmented front roof rail. Furthermore, it should be appreciated that the synchronizing linkage assemblies can take other forms with different shaped components and/or pivot points and/or more or less components.

Thus, the foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A convertible roof system comprising:

a roof member movable between a raised and stowed position;

at least one link coupled to the roof member and operable to move the roof member between the raised and stowed positions; and a dampening device coupled to the at least one link and operable to dampen a portion of the movement of the roof member from the raised position to the stowed position and to dampen a portion of the movement of the roof member from the stowed position to the raised position.

2. The convertible roof system of claim 1, wherein the moveable roof member is a flexible roof cover and the at least one link is part of a top stack mechanism operable to move the roof cover between the raised and stowed positions.

3. The convertible roof system of claim 2, wherein the top stack mechanism includes a pair of roof rails that move inwardly toward a longitudinal center line of the top stack mechanism during movement of the top stack mechanism from the raised position toward the stowed position.

4. The convertible roof system of claim 3, further comprising a front roof bow and wherein a pair of links couple the pair of roof rails to the front roof bow.

5. The convertible roof system of claim 4, further comprising at least one synchronizing member interconnecting the pair of links and constraining inward movement of the pair of roof rails.

6. The convertible roof system of claim 2, wherein the top stack mechanism includes at least three pairs of roof rails.

7. The convertible roof system of claim 1, wherein the dampening device dampens an end portion of the movement of the roof member toward a fully raised position.

8. The convertible roof system of claim 1, wherein initial movement of the roof member from the raised position and the stowed position is free of dampening by the dampening device.

9. The convertible roof system of claim 1, wherein the dampening device only dampens movement of the roof member during a partial portion of the movement of the roof member from the raised position to the stowed position and only dampens movement of the roof member during a partial portion of the movement of the roof member from the stowed position to the raised position.

10. The convertible roof system of claim 1, wherein the dampening device includes a cylinder having an extendable rod connected to a piston and a fluid within the cylinder in contact with the piston.

11. The convertible roof system of claim 10, wherein movement of the rod in a first direction relative to the cylinder is dampened and movement of the rod in a second direction relative to the cylinder is substantially uninhibited.

12. The convertible roof system of claim 1, wherein the dampening device goes from an under-center position to an over-center position during movement of the roof member between the stowed and raised positions.

13. The convertible roof system of claim 1, wherein the at least one link is a rearmost roof rail and the dampening device is connected to the rearmost roof rail and to a fixed location.

14. The convertible roof system of claim 1, wherein the dampening device dampens a different portion of the movement of the roof member from the raised position to the stowed position than is dampened during the movement of the roof member from the stowed position to the raised position.

15. A method of operating a convertible roof between raised and stowed positions, the method comprising:
(a) moving a member of the convertible roof between the raised position and the stowed position;
(b) dampening a portion of the movement of the convertible roof member from the raised position to the stowed position; and
(c) dampening a portion of the movement of the convertible roof member from the stowed position to the raised position.

16. The method of claim 15, wherein the convertible roof includes a top stack mechanism and (b) includes dampening a portion of the movement of a link of the top stack mechanism.

17. The method of claim 16, wherein (b) includes dampening a portion of the movement of a rearmost roof rail of the top stack mechanism with a dampening device connected to the rearmost roof rail.

18. The method of claim 15, wherein (b) includes resisting the portion of the movement of the convertible roof with a fluid.

19. The method of claim 18, wherein resisting the portion of the movement with a fluid includes moving a piston within a housing containing the fluid and resisting at least some relative movement between the piston and the housing with the fluid.

20. The method of claim 15, wherein a different portion of the movement of the convertible roof member from the raised position to the stowed position is dampened than the portion of the movement of the convertible roof member that is dampened during movement from the stowed position to the raised position.

21. The method of claim 15, wherein (b) includes dampening an end portion of the movement of the convertible roof member from the raised position to the stowed position.

22. The method of claim 15, wherein (b) includes moving a dampening device from an under-center position to an over-center position.

23. The method of claim 15, further comprising exerting a pulling force on a dampening device during a portion of the movement of the convertible roof member from the raised position to the stowed position and exerting a pushing force on the dampening device during a different portion of the movement of the convertible roof member from the raised position to the stowed position.

24. The method of claim 15, wherein (b) includes dampening only a partial portion of the movement of the convertible roof member between the raised position and the stowed position.

25. The method of claim 15, wherein (b) includes dampening the portion of the movement in response to rotation of a rotatable member of the convertible roof.

26. The method of claim 15, further comprising moving a pair of roof rails inwardly toward a longitudinal center line of the convertible roof during movement from the raised position to the stowed position.

27. The method of claim 15, wherein (a) includes moving the roof member with a powered actuator.

28. A four-door automotive vehicle having the convertible roof system of claim 1.

29. The convertible roof system of claim 1, wherein the dampening device is pivotally coupled to a fixed location relative to a vehicle on which the convertible roof system is utilized.

30. The convertible roof system of claim 1, wherein the dampening device is passive and dampens solely in response to movement of the roof member.

31. The convertible roof system of claim 1, wherein the dampening device is entirely self-contained.

32. The convertible roof system of claim 1, wherein the dampening device only dampens movement when being extended.

33. A convertible roof system comprising:
- a roof member movable between a raised position and a stowed position;
- at least one link coupled to the roof member and operable to move the roof member between the raised and stowed positions; and
- at least one dampening device coupled to the at least one link and operable to dampen a portion of the movement of the roof member from the raised position to the stowed position and dampen a portion of the movement of the roof member from the stowed position to the raised position.

34. The convertible roof system of claim 1, further comprising an automatic actuator operable to drive movement of the at least one link to move the roof member between the raised and stowed positions.

35. The convertible roof system of claim 33, wherein the dampening device dampens an end portion of the movement of the roof member from the raised position to the stowed position.

36. The convertible roof system of claim 33, wherein the dampening device is coupled to a fixed location on a vehicle on which the convertible roof system is utilized.

37. The convertible roof system of claim 33, wherein the roof member and the at least one link are part of a top stack mechanism and the top stack mechanism is operable to cover front and rear passenger seating areas.

38. The convertible roof system of claim 33, wherein the dampening device is passive and dampens solely in response to movement of the roof member.

39. The convertible roof system of claim 33, wherein said at least one dampening device is a plurality of dampening devices, a first one of said dampening devices is disposed on one side of a vehicle, and a second one of said dampening devices is disposed on opposite side of the vehicle.

* * * * *